United States Patent
Saito et al.

(10) Patent No.: US 11,153,051 B2
(45) Date of Patent: Oct. 19, 2021

(54) USER TERMINAL, WIRELESS BASE STATION, AND WIRELESS COMMUNICATION METHOD

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 92 days.

(21) Appl. No.: 16/609,712

(22) PCT Filed: May 2, 2017

(86) PCT No.: PCT/JP2017/017292
§ 371 (c)(1),
(2) Date: Oct. 30, 2019

(87) PCT Pub. No.: WO2018/203395
PCT Pub. Date: Nov. 8, 2018

(65) Prior Publication Data
US 2021/0105113 A1 Apr. 8, 2021

(51) Int. Cl.
*H04W 4/00* (2018.01)
*H04L 5/00* (2006.01)
*H04W 72/04* (2009.01)

(52) U.S. Cl.
CPC .......... *H04L 5/0048* (2013.01); *H04W 72/04* (2013.01)

(58) Field of Classification Search
CPC .............................. H04L 5/0048; H04W 72/04
USPC ........................................................ 370/329
See application file for complete search history.

(56) References Cited

U.S. PATENT DOCUMENTS

2016/0087709 A1* 3/2016 Horiuchi ................ H04B 7/068
375/260

FOREIGN PATENT DOCUMENTS

JP 2013-243706 A 12/2013
WO WO-2014130082 A1 * 8/2014 ........... H04L 5/0082

OTHER PUBLICATIONS

Samsung (Evaluation results on DL DMRS Patterns for NR, R1-1702957) (Year: 2017).*

(Continued)

*Primary Examiner* — Maharishi V Khirodhar
(74) *Attorney, Agent, or Firm* — Osha Bergman Watanabe & Burton LLP

(57) ABSTRACT

A user terminal (20) is provided with: a reception unit (202) which receives a downlink signal containing a demodulation reference signal; a control unit (203) which separates the demodulation reference signal from the downlink signal; and a channel estimation unit (204) which calculates a channel estimation value using the demodulation reference signal. The demodulation reference signal is mapped to a resource element defined for a transmission pattern for a user terminal, and the transmission pattern for a user terminal is selected from among a plurality of transmission patterns for user terminals, so as to be different among the user terminals, and the demodulation reference signals to be mapped to the respective resource elements defined for the plurality of user terminal transmission patterns are configured to be mutually orthogonal to one another among the different user terminal transmission patterns.

4 Claims, 21 Drawing Sheets

(56) References Cited

OTHER PUBLICATIONS

Nokia, Alcatel-Lucent Shanghai Bell ("DL DMRS patterns link performance evaluation" R1-1703181) (Year: 2017).*
Mitsubishi Electric ("DMRS designs for NR MIMO", R1-1702751) (Year: 2017).*
CATT ( Discussion on DMRS design for DL, R1-1702072) (Year: 2017).*
ITL (Considerations on DMRS pattern design for NR, 2017, R1-1705794) (Year: 2017).*
International Search Report issued in PCT/JP2017/017292 dated Jun. 6, 2017 (5 pages).
Written Opinion of the International Searching Authority issued in PCT/JP2017/017292 dated Jun. 6, 2017 (4 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).

* cited by examiner

USER TERMINAL, WIRELESS BASE STATION, AND WIRELESS COMMUNICATION METHOD

CROSS-REFERENCE TO RELATED APPLICATIONS

The present application is a national stage application of PCT Application No. PCT/JP2017/017292, filed on May 2, 2017. The content of the priority application is incorporated by reference in its entirety.

TECHNICAL FIELD

The present invention relates to a user terminal, a radio base station, and a radio communication method.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NFL") 1). Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio Access Technology (New-RAT), and the like.

Supporting a wide range of frequencies from a low carrier frequency to a high carrier frequency is expected for the future radio communication system (for example, 5G). For example, propagation path environment (for example, communication quality and frequency selectivity) and/or a request condition (moving speed of supported terminal) are largely different depending on a frequency band such as a low carrier frequency and a high carrier frequency. Therefore, it is desirable to flexibly support arrangement (mapping) of a reference signal and the like depending on the propagation path environment and/or the request condition for the future radio communication system.

For example, configuring mapping patterns for reference signals that are different in reference signal density (for example, mapping interval and/or number of reference signals in frequency direction and/or time direction) to terminals different in request conditions and/or propagation path environment from each other has been studied for the future radio communication system.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

However, if the terminals receive the respective reference signals that are mapped based on the mapping patterns different from one another and perform channel estimation, channel estimation accuracy may be deteriorated.

The present invention is made in consideration of such circumstances, and an object of the present invention is to provide a user terminal, a radio base station, and a radio communication method each achieving a configuration of a reference signal and the like that suppresses deterioration of channel estimation accuracy and is suitable for the future radio communication system.

Solution to Problem

A user terminal according to one aspect of the present invention includes: a reception section that receives a downlink signal including a demodulation reference signal; a control section that separates the demodulation reference signal from the downlink signal; and a channel estimation section that calculates a channel estimation value with use of the demodulation reference signal, in which the demodulation reference signal is mapped to resource elements defined for a user terminal transmission pattern, the user terminal transmission pattern is selected to be different between user terminals, from a plurality of user terminal transmission patterns, and the demodulation reference signals mapped to the resource elements defined for the respective user terminal transmission patterns are orthogonal to each other between the user terminal transmission patterns.

Advantageous Effects of Invention

According to one aspect of the present invention, it is possible to achieve a configuration of a reference signal and the like that suppresses deterioration of channel estimation accuracy and is suitable for the future radio communication system.

DESCRIPTION OF EMBODIMENTS

Hereinafter, an embodiment of the present invention will be described in detail with reference to the accompanying drawings.

Embodiment

Figure 1:
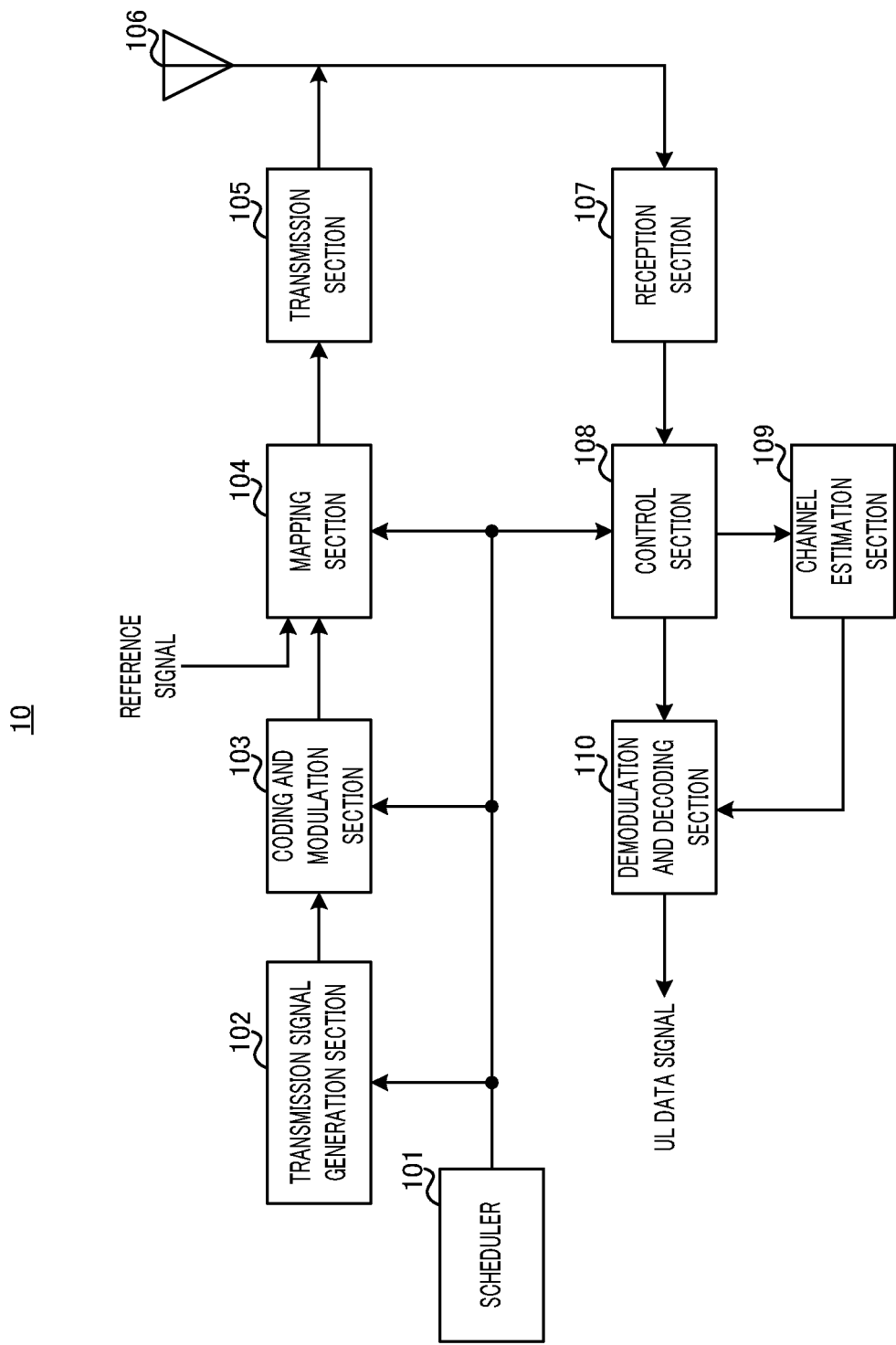
FIG. 1 is a block diagram illustrating an exemplary entire configuration of a radio base station according to an embodiment of the present invention.
Figure 2:
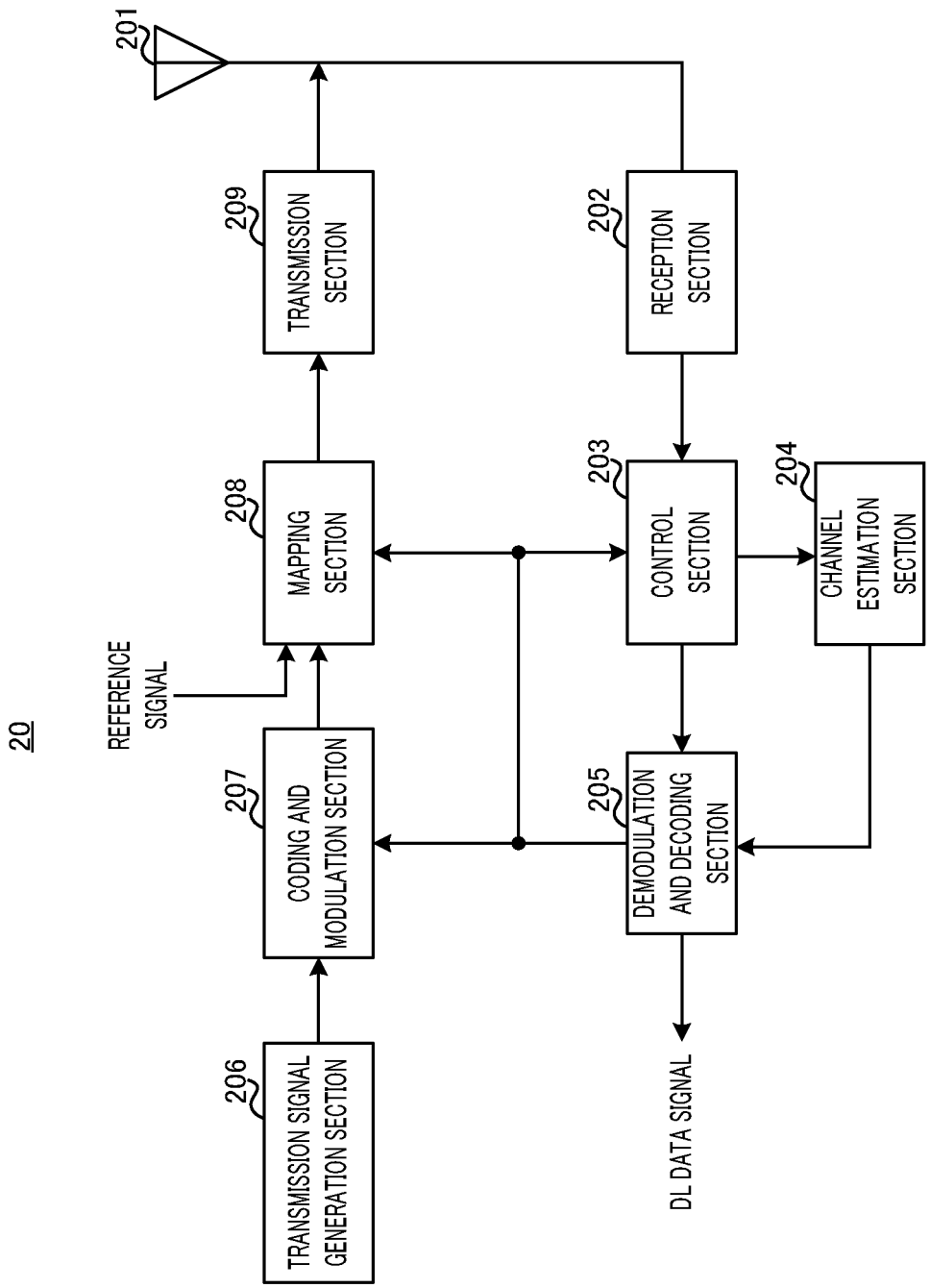
FIG. 2 is a block diagram illustrating an exemplary entire configuration of a user terminal according to an embodiment of the present invention.

A radio communication system according to the present embodiment at least includes radio base station 10 illustrated in FIG. 1 and user terminal 20 illustrated in FIG. 2. User terminal 20 is connected to radio base station 10.

Radio base station 10 transmits a downlink (DL) control signal to user terminal 20 through a downlink control channel (for example, Physical Downlink Control Channel (PDCCH)), and transmits a DL data signal and a demodulation reference signal (hereinafter referred to as DMRS) to demodulate the DL data signal through a downlink data channel (for example, Physical Downlink Shared Channel (PDSCH)). In addition, user terminal 20 transmits an uplink (UL) control signal to radio base station 10 through an uplink control channel (for example, Physical Uplink Control Channel (PUCCH)), and transmits a UL data signal and the DMRS through an uplink data channel (for example, Physical Uplink Shared Channel (PUSCH)).

Note that the downlink channel and the uplink channel through which radio base station 10 and user terminal 20 perform transmission and reception are not limited to the PDCCH, the PDSCH, the PUCCH, and the PUSCH described above, and may be other channels such as a Physical Broadcast Channel (PBCH) and a Random Access Channel (RACH).

In addition, in FIG. 1 and FIG. 2, a waveform of the DL/UL signal generated in radio base station 10 and user terminal 20 may be a signal waveform based on Orthogonal Frequency Division Multiplexing (OFDM) modulation, a signal waveform based on Single Carrier-Frequency Division Multiple Access (SC-FDMA) or DFT-Spread-OFDM (DFT-S-OFDM), or any other signal waveform. In FIG. 1 and FIG. 2, illustration of constituent sections for generation of the signal waveform (for example, IFFT processing section, CP addition section, CP removal section, and FFT processing section) is omitted.

<Radio Base Station>

FIG. 1 is a block diagram illustrating an exemplary entire configuration of radio base station 10 according to the present embodiment. Radio base station 10 illustrated in FIG. 1 includes scheduler 101, transmission signal generation section 102, coding and modulation section 103, mapping section 104, transmission section 105, antenna 106, reception section 107, control section 108, channel estimation section 109, and demodulation and decoding section 110. Radio base station 10 includes a Multi-User Multiple-Input Multiple-Output (MU-MIMO) configuration that performs communication with plurality of user terminals 20 at the same time.

Scheduler 101 performs scheduling (for example, resource allocation) of the DL signal (such as DL data signal, DL control signal, and DMRS). In addition, scheduler 101 performs scheduling (for example, resource allocation) of the UL signal (such as UL data signal, UL control signal, and DMRS).

In the scheduling, scheduler 101 previously prepares a plurality of mapping patterns each representing resource elements to which the DMRS of the DL signal is mapped, and selects one mapping pattern from the plurality of mapping patterns based on, for example, the request condition and/or the propagation path environment of each user terminal 20. The plurality of prepared mapping patterns is different in density of the DMRS (for example, mapping interval and/or number of DMRS in frequency direction and/or time direction) from one another. Further, each of the mapping patterns may define resource elements to which the DMRS is mapped over a plurality of layers.

The request condition and/or the propagation path environment of user terminal 20 include, for example, at least one of a level of frequency selectivity of the channel, a level of reception quality in user terminal 20, shortness of a reception processing time, and a moving speed of user terminal 20. In a case where the request condition and/or the propagation path environment of user terminal 20 is different among user terminals 20, scheduler 101 selects different mapping patterns for respective user terminals 20. Note that scheduler 101 may select the same mapping pattern for plurality of user terminals 20.

In addition, scheduler 101 configures the mapping pattern of each of user terminals 20 based on the corresponding selected mapping pattern. For example, in a case where the selected mapping pattern includes the DMRS of a plurality of layers (plurality of DMRS ports), scheduler 101 allocates one or more layers (one or more DMRS ports) to each of user terminals 20. Hereinafter, the mapping pattern of the DMRS configured to user terminal 20 is referred to as a user pattern. In other words, in this case, the user pattern defines resource elements of a part of the layers of the mapping pattern that defines the resource elements to which the DMRS is mapped over the plurality of layers.

Note that a specific example of the plurality of mapping patterns previously prepared and a specific example of the user patterns configured based on the plurality of mapping patterns are described below.

An index is associated with each of the user patterns. Further, user terminal 20 specifies the user pattern through notification of the index representing the configured user pattern to user terminal 20. The index representing the user pattern may be notified to user terminal 20 by, for example, higher layer (for example, Radio Resource Control (RRC) or Medium Access Control (MAC)) signaling, or may be notified to user terminal 20 by physical layer (PHY) signaling.

Alternatively, the user pattern and at least one of the other parameters (for example, system bandwidth, carrier frequency, information relating to DL data signal (for example, mapping pattern of DL data signal)) may be uniquely associated with each other. In this case, user terminal 20 can implicitly specify the user pattern based on the other parameters. This makes it possible to reduce signaling for notification of the user pattern.

Further, the user pattern of the DMRS of the DL signal may be configured by user terminal 20 without limitation to radio base station 10 (scheduler 101). In a case where user terminal 20 configures the user pattern, radio base station 10 can receive notification of the index representing the configured user pattern from user terminal 20 (not illustrated).

Scheduler 101 configures the user pattern for each of user terminals 20, and outputs scheduling information including the user pattern to transmission signal generation section 102 and mapping section 104.

In addition, scheduler 101 configures MCS (such as coding rate and modulation scheme) of the DL data signal and the UL data signal based on, for example, channel quality between radio base station 10 and user terminal 20, and outputs MCS information to transmission signal generation section 102 and coding and modulation section 103. Note that the MCS may be configured by user terminal 20 without limitation to radio base station 10. In a case where user terminal 20 configures the MCS, radio base station 10 can receive the MCS information from user terminal 20 (not illustrated).

Transmission signal generation section 102 generates a transmission signal (including DL data signal and DL control signal). For example, the DL control signal includes downlink control information (DCI) including the scheduling information (for example, resource allocation information of DL data signal) or the MCS information output from scheduler 101. Transmission signal generation section 102 outputs the generated transmission signal to coding and modulation section 103.

Coding and modulation section 103 performs coding processing and modulation processing on the transmission signal provided from transmission signal generation section 102 based on, for example, the MCS information provided from scheduler 101. Coding and modulation section 103 outputs a modulated transmission signal to mapping section 104.

Mapping section 104 maps the transmission signal provided from coding and modulation section 103 to predetermined radio resources (DL resources) based on the scheduling information (for example, DL resource allocation) provided from scheduler 101. Further, mapping section 104 maps a reference signal (for example, DMRS) to predetermined radio resources (DL resources) based on the scheduling information. Mapping section 104 outputs the DL signal mapped to the radio resources to transmission section 105.

Transmission section 105 performs transmission processing such as upconversion and amplification on the DL signal provided from mapping section 104, and transmits a radio frequency signal (DL signal) from antenna 106.

Reception section 107 performs reception processing such as amplification and downconversion on a radio frequency signal (UL signal) received by antenna 106, and outputs the UL signal to control section 108.

Control section 108 separates (demaps) the UL data signal and the DMRS from the UL signal provided from reception section 107 based on the scheduling information (UL resource allocation) provided from scheduler 101. Further, control section 108 outputs the UL data signal to demodulation and decoding section 110 and outputs the DMRS to channel estimation section 109.

Channel estimation section 109 performs channel estimation with use of the DMRS of the UL signal, and outputs a channel estimation value as a result of the estimation to demodulation and decoding section 110.

Demodulation and decoding section 110 performs demodulation processing and decoding processing on the UL data signal provided from control section 108 based on the channel estimation value provided from channel estimation section 109. Demodulation and decoding section 110 transfers the demodulated UL data signal to an application section (not illustrated). Note that the application section performs processing relating to a layer higher than a physical layer or an MAC layer, and the like.

<User Terminal>

FIG. 2 is a block diagram illustrating an exemplary entire configuration of user terminal 20 according to the present embodiment. User terminal 20 illustrated in FIG. 2 includes antenna 201, reception section 202, control section 203, channel estimation section 204, demodulation and decoding section 205, transmission signal generation section 206, coding and modulation section 207, mapping section 208, and transmission section 209.

Reception section 202 performs reception processing such as amplification and downconversion on a radio frequency signal (DL signal) received by antenna 201, and outputs a DL signal to control section 203. The DL signal at least includes a DL data signal and a DMRS.

Control section 203 separates (demaps) the DL control signal and the DMRS from the DL signal provided from reception section 202. Further, control section 203 outputs the DL control signal to demodulation and decoding section 205 and outputs the DMRS to channel estimation section 204.

At this time, control section 203 controls reception of the DMRS from the DL signal based on the user pattern previously notified.

Further, control section 203 separates (demaps) the DL data signal from the DL signal based on the scheduling information (for example, DL resource allocation information) provided from demodulation and decoding section 205, and outputs the DL data signal to demodulation and decoding section 205.

Channel estimation section 204 performs channel estimation with use of the separated DMRS, and outputs a channel estimation value as a result of the estimation to demodulation and decoding section 205.

Demodulation and decoding section 205 demodulates the DL control signal provided from control section 203. Further, demodulation and decoding section 205 performs decoding processing (for example, blind detection processing) on the demodulated DL control signal. Demodulation and decoding section 205 outputs the scheduling information addressed to the own terminal (mapping configuration including DL/UL resource allocation or user pattern of DMRS) that has been obtained through decoding of the DL control signal, to control section 203 and mapping section 208, and outputs the MCS information for the UL data signal to coding and modulation section 207.

Further, demodulation and decoding section 205 performs demodulation processing and decoding processing using the channel estimation value provided from channel estimation section 204, on the DL data signal provided from control section 203, based on the MCS information for the DL data signal included in the DL control signal provided from control section 203. Further, demodulation and decoding section 205 transfers the demodulated DL data signal to an application section (not illustrated). Note that the application section perform is processing relating to a layer higher than a physical layer or an MAC layer, and the like.

Transmission signal generation section 206 generates a transmission signal (including UL data signal or UL control signal), and outputs the generated transmission signal to coding and modulation section 207.

Coding and modulation section 207 performs coding processing and modulation processing on the transmission signal provided from transmission signal generation section 206 based on, for example, the MCS information provided from demodulation and decoding section 205. Coding and modulation section 207 outputs the modulated transmission signal to mapping section 208.

Mapping section 208 maps the transmission signal provided from coding and modulation section 207 to predetermined radio resources (UL resources) based on the scheduling information (UL resource allocation) provided from demodulation and decoding section 205. Further, mapping section 208 maps a reference signal (for example, DMRS) to predetermined radio resources (UL resources) based on the scheduling information (for example, mapping configuration including user pattern of DMRS).

Transmission section 209 performs transmission processing such as upconversion and amplification on the UL signal (at least including UL data signal and DMRS) provided from mapping section 208, and transmits a radio frequency signal (UL signal) from antenna 201.

Next, a specific example of the plurality of mapping patterns and a specific example of the user patterns configured based on the plurality of mapping patterns are described.

First, as a first configuration example, an example in which a mapping pattern (or user pattern) with low DMRS density has a configuration in which a part of REs to which the DMRS is mapped in a mapping pattern (or user pattern) with high DMRS density is decimated is described.

Note that, in the following description, plurality of user terminals 20 is denoted by user terminal #1, user terminal #2, and the like in order to distinguish plurality of user terminals 20, and the user patterns configured to respective user terminals 20 are denoted by user pattern #1, user pattern #2, and the like in order to distinguish the user patterns.

First Configuration Example

Figure 3:
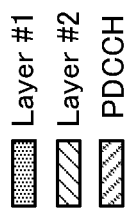
FIG. 3 illustrates user patterns according to a first configuration example.
Figure 3:
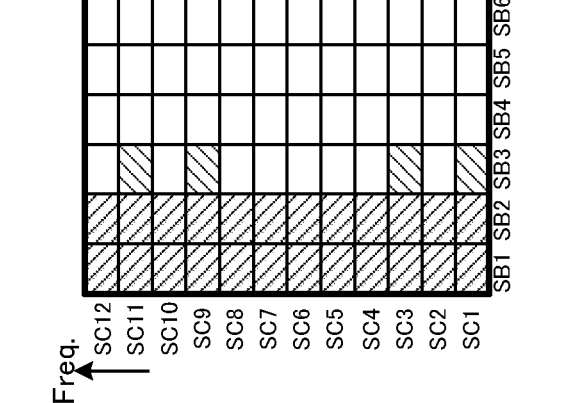
Figure 3:
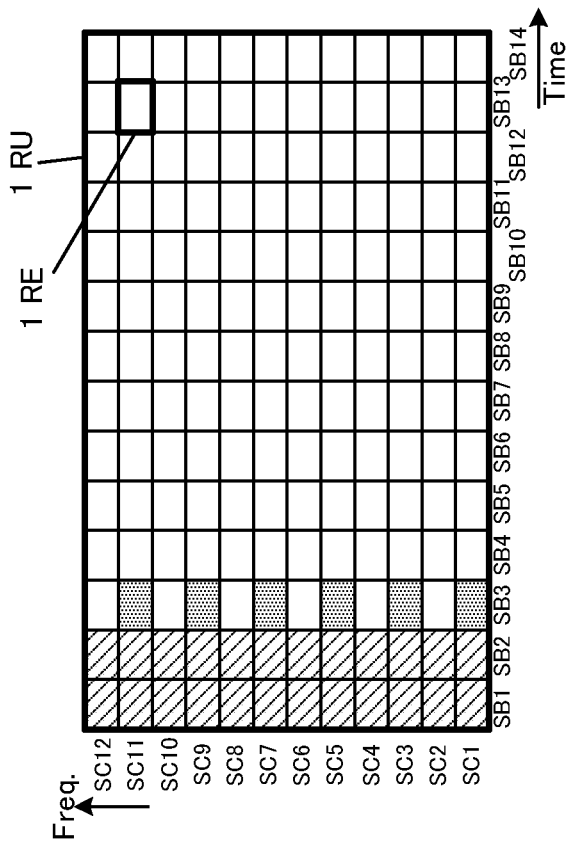

FIG. 3 illustrates user patterns according to the first configuration example. FIG. 3 illustrates two user patterns (user pattern #1 and user pattern #2) as examples. Each of the user patterns indicates a mapping position of the DMRS in a resource unit (RU, also referred to as resource block, resource block pair, and the like) that is a resource allocation unit. The RU includes a configuration in which 168 resource elements (REs) are arranged by 14 pieces in a time direction and by 12 pieces in a frequency direction. One RE is a radio resource domain defined by one symbol and one subcarrier. In other words, one RU includes 14 symbols and 12 subcarriers.

Note that, in the following description, 14 symbols of the RU in the time direction are referred to as SB1 to SB14 from left. Further, 12 subcarriers of the RU in the frequency direction are referred to as SC1 to SC12 from below.

A control signal channel (for example, PDCCH) is mapped to the REs of two symbols (namely, SB1 and SB2) at the head of the RU.

User pattern #1 (user pattern of user terminal #1) is a pattern in which DMRS of layer #1 is relatively densely mapped to SB3, and user pattern #2 (user pattern of user terminal #2) is a pattern in which the DMRS of layer #2 is relatively sparsely mapped to SB3, as compared with user pattern #1.

User pattern #2 has a configuration in which a part (SC5 and SC7 in SB3 in FIG. 3) of REs to which the DMRS is mapped in user pattern #1 is decimated. In such a case, the DMRSs of different user patterns are configured so as to be orthogonal to each other by at least one of Code Division Multiplexing (CDM), Time Division Multiplexing (TDM), and Frequency Division Multiplexing (FDM).

In the following, the plurality of mapping patterns and user patterns configured based on the plurality of mapping patterns to which the first configuration example is applied are described as an application example.

First Application Example

Figure 4:
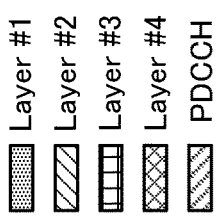
FIG. 4 illustrates mapping patterns according to a first application example.
Figure 4:
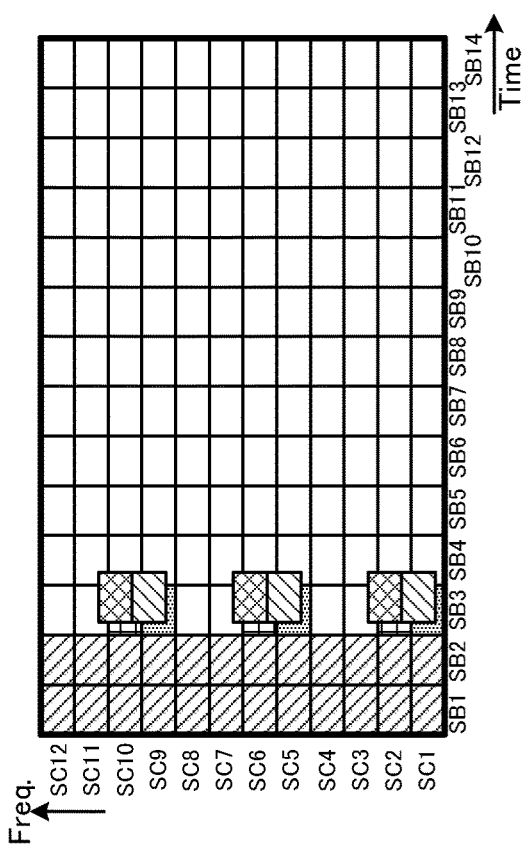
Figure 4:
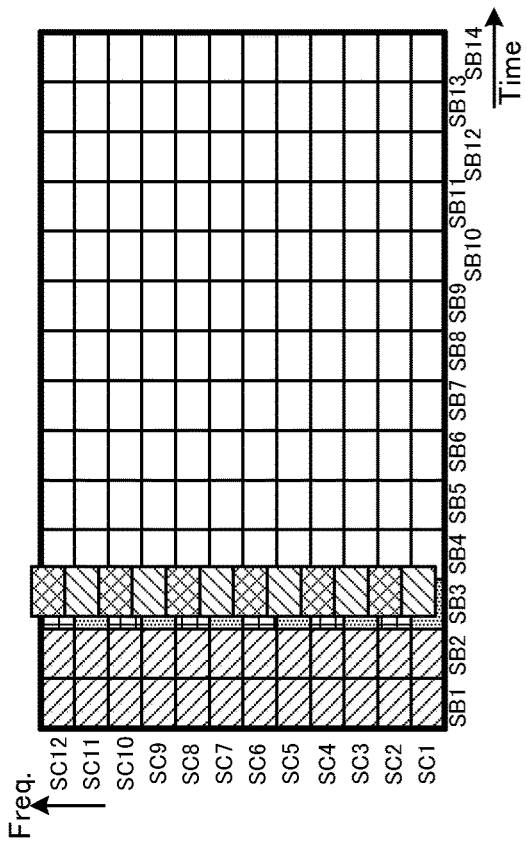

FIG. 4 illustrates mapping patterns according to a first application example. Each of the mapping patterns indicates a mapping position of the DMRS in the RU as a resource allocation unit. Further, each of two mapping patterns (mapping pattern #1 and mapping pattern #2) includes a mapping position of the DMRS in four layers (Layer #1 to Layer #4).

A control signal channel (for example, PDCCH) is mapped to the REs of two symbols (namely, SB1 and SB2) at the head of the RU.

Mapping pattern #1 is a pattern in which the DMRS in each of the layers is relatively densely mapped to SB3, and mapping pattern #2 is a pattern in which the DMRS in each of the layers is relatively sparsely mapped to SB3, as compared with mapping pattern #2.

Further, mapping pattern #2 has a configuration in which a part of the REs to which the DMRS is mapped in mapping pattern #1 is decimated. In the example of FIG. 4, mapping pattern #2 has a configuration in which the REs of SC3, SC4, SC7, SC8, SC11, and SC12 of SB3 in mapping pattern #1 are decimated.

For example, scheduler 101 of radio base station 10 selects one mapping pattern for each user terminal from the two mapping patterns illustrated in FIG. 4, based on the request condition and/or the propagation path environment of each user terminal. For example, in a case where user terminal #1 moves at a speed higher than a predetermined speed and user terminal #2 moves at a speed lower than the predetermined speed, scheduler 101 selects mapping pattern #1 for user terminal #1, and selects mapping pattern #2 for user terminal #2. Further, in a case where user terminal #1 has communication quality lower than predetermined communication quality and user terminal #2 has communication quality higher than the predetermined communication quality, scheduler 101 selects mapping pattern #1 for user terminal #1, and selects mapping pattern #2 for user terminal #2.

In addition, scheduler 101 allocates one or more layers to each user terminal to configure the user pattern of each user terminal.

In the following, an example in which layer #1 and layer #3 of mapping pattern #1 are allocated to user terminal #1, and layer #2 and layer #4 of mapping pattern #2 are allocated to user terminal #2 is described.

Figure 5:
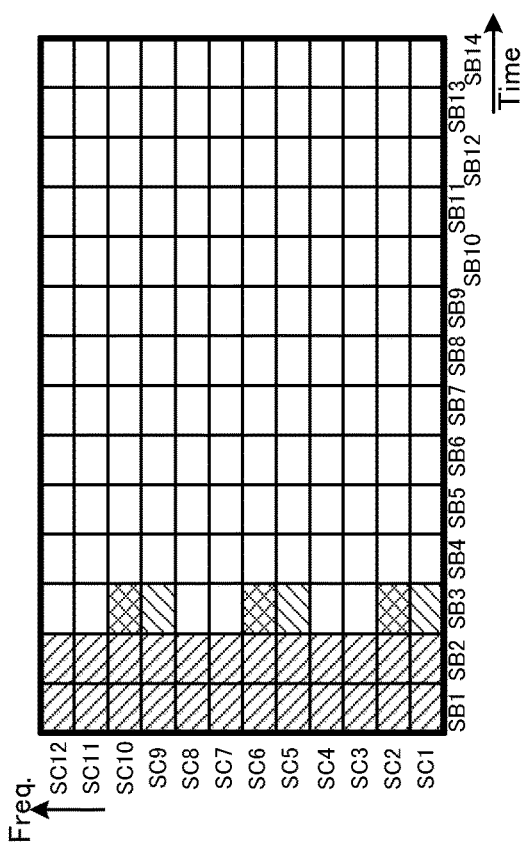
FIG. 5 illustrates user patterns according to the first application example.
Figure 5:
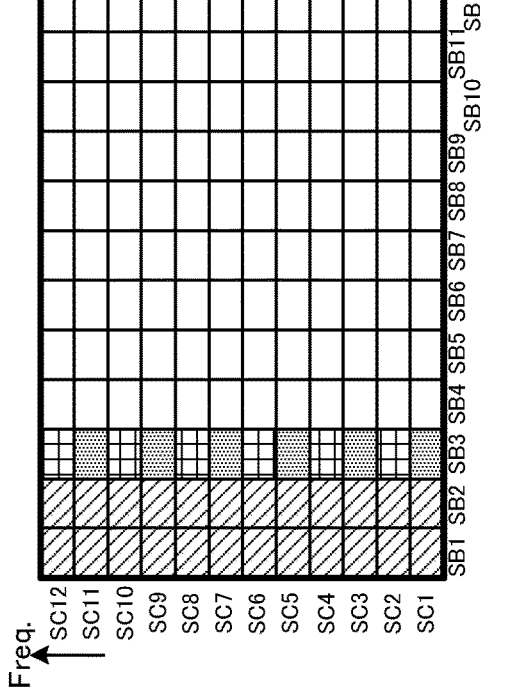

FIG. 5 illustrates user patterns according to the first application example. User pattern #1 (user pattern of user terminal #1) includes layer #1 and layer #3 of mapping pattern #1, and user pattern #2 (user pattern of user terminal #2) includes layer #2 and layer #4 of mapping pattern #2.

In this example, the DMRSs are mapped to the same REs in layer #1 of user pattern #1 and layer #2 of user pattern #2.

The DMRSs mapped to the same REs in the different user patterns are collapsed in orthogonality. Accordingly, the DMRSs mapped to the same REs in user pattern #1 and user pattern #2 are configured so as to be orthogonal to each other by Cyclic Shift.

Figure 6:
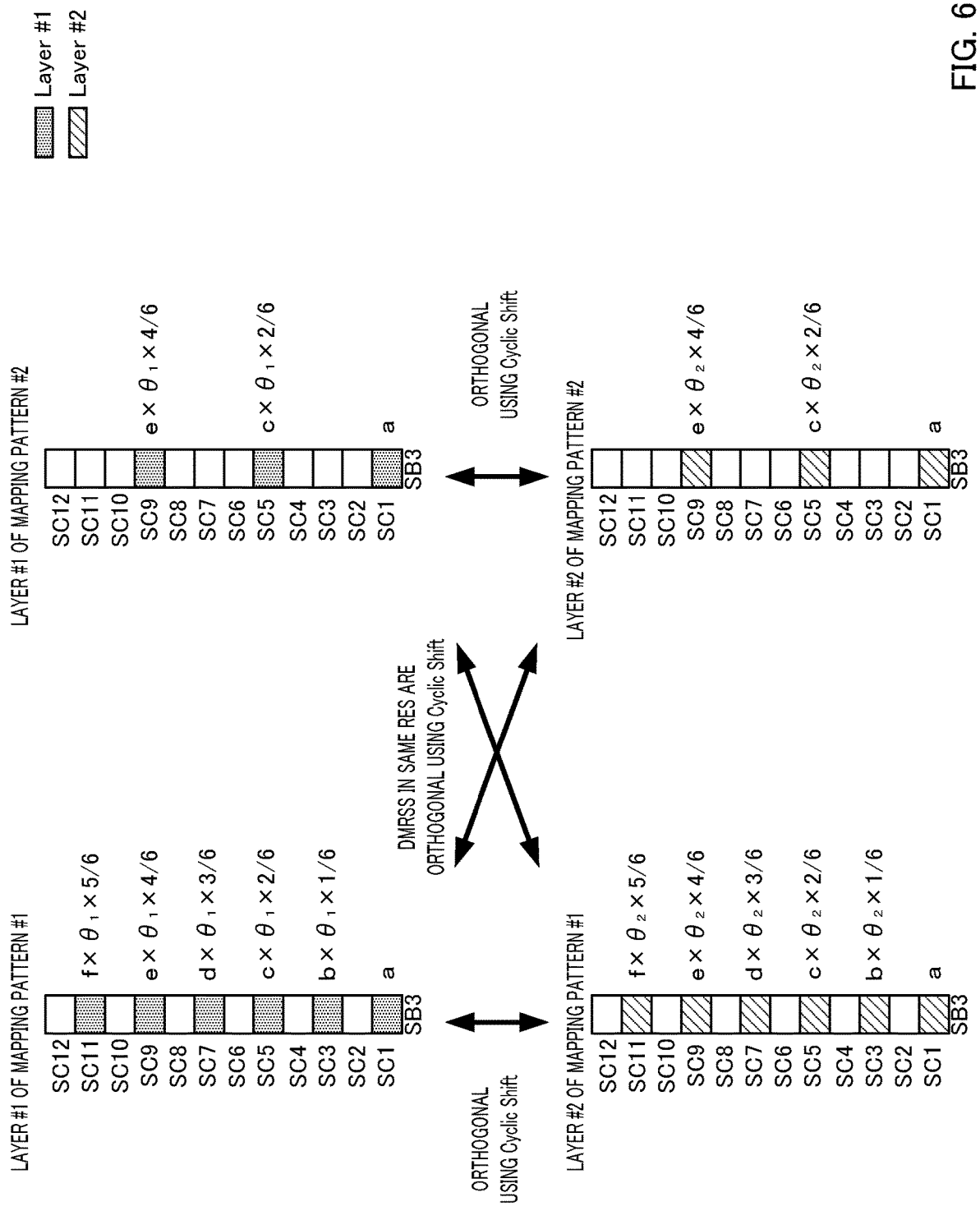
FIG. 6 illustrates a first example of Cyclic Shift according to the first application example.

FIG. 6 illustrates a first example of the Cyclic Shift according to the first application example. FIG. 6 illustrates an example of the Cyclic Shift for the DMRSs in layer #1 and layer #2 of mapping pattern #1 and in layer #1 and layer #2 of mapping pattern #2 illustrated in FIG. 4. Note that only SB3 to which the DMRS is mapped is illustrated in FIG. 6, and illustration of other symbols is omitted.

In FIG. 6, "a" to "f" in each of the REs represent a signal sequence of the DMRS, and $\theta_1$ and $\theta_2$ represent phase rotation amounts different from each other. Note that the same value or different values may be applied to "a" to "f".

The DMRSs mapped to the same REs in the different layers of the same mapping pattern are orthogonal to each other by the Cyclic Shift.

For example, the DMRS in layer #1 of mapping pattern #1 and the DMRS in layer #2 of mapping pattern #1 in FIG. 6 are orthogonal to each other by the Cyclic Shift adopting the phase rotation amounts different from each other. Likewise, the DMRS in layer #1 of mapping pattern #2 and the DMRS in layer #2 of mapping pattern #2 in FIG. 6 are orthogonal to each other by the Cyclic Shift adopting the phase rotation amounts different from each other.

Further, the same signal sequence and the same phase rotation amount are applied to the DMRSs mapped to the same REs in the same layers of the different mapping patterns. The DMRS having the same value is mapped to the same REs in the different mapping patterns by applying the same signal sequence and the same phase rotation amount.

For example, the same signal sequence "c" and the same phase rotation amount $\theta_1 \times 2/6$ are applied to the DMRS mapped to SC5 in layer #1 of mapping pattern #1 and to the DMRS mapped to SC5 in layer #1 of mapping pattern #2 in FIG. 6.

As described above, the DMRSs mapped to the same REs in the different layers of the different mapping patterns are orthogonal to each other by applying the same signal sequence and the same phase rotation amount to the DMRSs mapped to the same REs in the same layers of the different mapping patterns.

For example, out of the DMRS in layer #1 of mapping pattern #1 and the DMRS in layer #2 of mapping pattern #2 in FIG. 6, the DMRSs in the same REs (SC1, SC5, and SC9) are orthogonal to each other by the Cyclic Shift adopting the different phase rotation amounts.

With this configuration, the DMRSs in the same REs are orthogonal to each other in layer #1 of mapping pattern #1 allocated as user pattern #1 and in layer #2 of mapping pattern #2 allocated as user pattern #2. This makes it possible to suppress deterioration of channel estimation accuracy in each of the user terminals (user terminal #1 and user terminal #2).

Further, in this configuration, the same signal sequence and the same phase rotation amount are applied to the DMRSs mapped to the same REs in the same layers of the different mapping patterns. As a result, orthogonality of the DMRSs between the different layers in one mapping pattern is usable between the mapping patterns. This makes it possible to make the DMRSs mapped to the same REs in the different layers of the different mapping patterns orthogonal to each other.

Note that, in FIG. 5, the DMRSs are mapped to the same REs in layer #3 of mapping pattern #1 allocated as user pattern #1 and in layer #4 of mapping pattern #2 allocated as user pattern #2. As for the DMRSs mapped to the same REs in layer #3 and layer #4, applying the same signal sequence and the same phase rotation amount to the DMRSs mapped to the same REs in the same layers of the different mapping patterns makes the DMRSs mapped to the same REs in the different layers of the different mapping patterns orthogonal to each other, as with the relationship of layer #1 and layer #2 illustrated in FIG. 6.

Note that the signal sequence and the phase rotation amount applied to the DMRSs mapped to the same REs in user pattern #1 and user pattern #2 in FIG. 5 are not limited to the example illustrated in FIG. 6. Next, a second example of the signal sequence and the phase rotation amount applied to the DMRSs mapped to the same REs in user pattern #1 and user pattern #2 in FIG. 5 is described.

Figure 7:
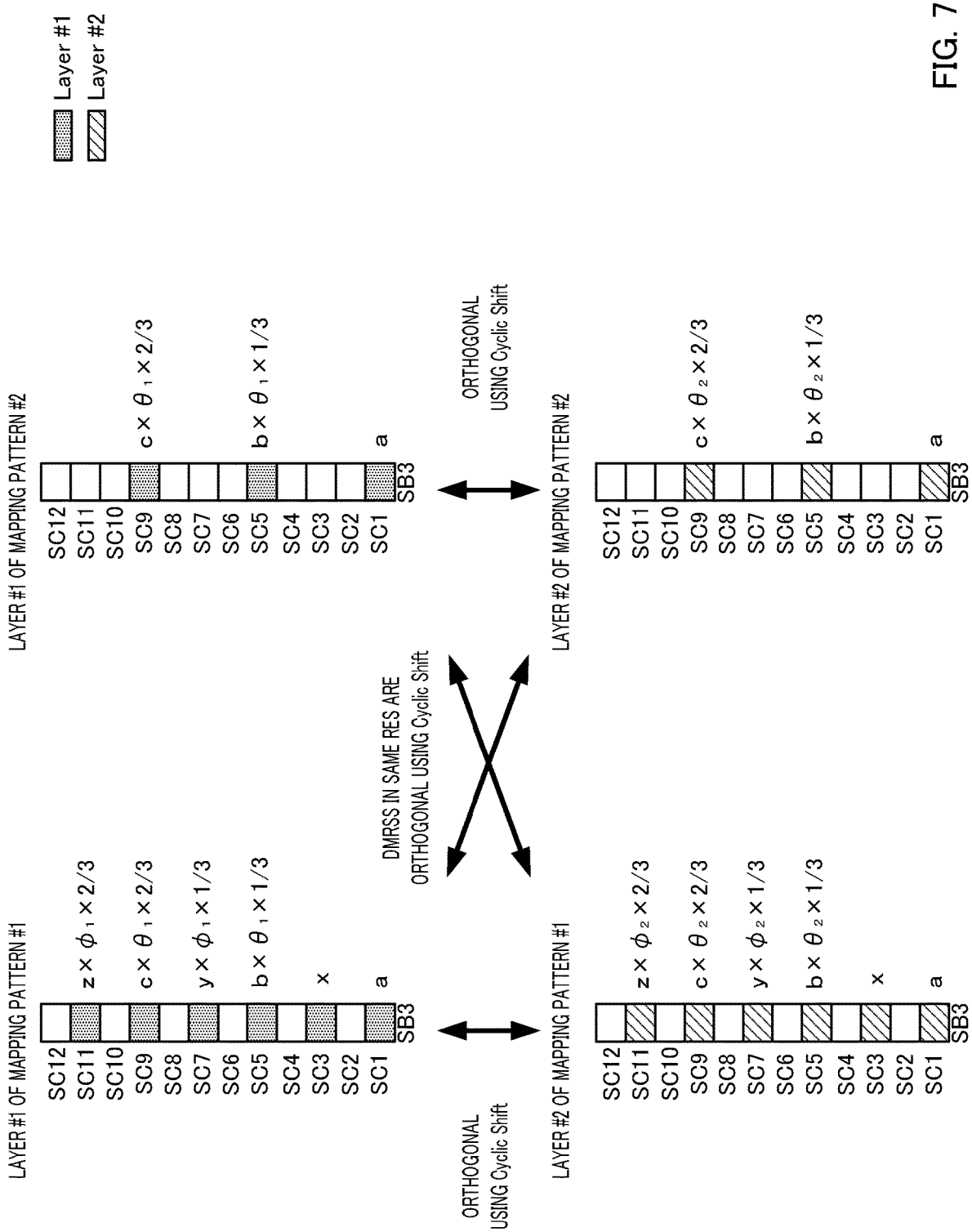
FIG. 7 illustrates a second example of the Cyclic Shift according to the first application example.

FIG. 7 illustrates a second example of the Cyclic Shift according to the first application example. In a manner similar to FIG. 6, FIG. 7 illustrates an example of the Cyclic Shift for the DMRSs in layer #1 and layer #2 of mapping pattern #1 and in layer #1 and layer #2 of mapping pattern #2 illustrated in FIG. 4. Note that only SB3 to which the DMRS is mapped is illustrated in FIG. 7, and illustration of other symbols is omitted.

In FIG. 7, "a" to "c" and "x" to "z" in each of the REs represent a signal sequence of the DMRS, and $\theta_1$, $\theta_2$, $\phi_1$, and $\phi_2$ represent phase rotation amounts different from one another. FIG. 7 and FIG. 6 are different in the signal sequence and the phase rotation amounts applied to each of the DMRSs. Note that the same value or different values may be applied to "a" to "c" or/and "x" to "z". Further, the same value or different values may be applied to "a" and "x", "b" and "y", and "c" and "z". Furthermore, the same value or different values may be applied to $\theta_1$ and $\phi_1$, and $\theta_2$ and $\phi_2$.

Also in FIG. 7, the same signal sequence and the same phase rotation amount are applied to the DMRSs mapped to the same REs in the same layers of the different mapping patterns. The DMRS having the same value is mapped to the same REs in the different mapping patterns by applying the same signal sequence and the same phase rotation amount.

For example, the same signal sequence "b" and the same phase rotation amount $\theta_1 \times 1/3$ are applied to the DMRS mapped to SC5 in layer #1 of mapping pattern #1 and the DMRS mapped to SC5 in layer #1 of mapping pattern #2 in FIG. 7.

As described above, the DMRSs mapped to the same REs in the different layers of the different mapping patterns are orthogonal to each other by applying the same signal sequence and the same phase rotation amount to the DMRSs mapped to the same REs in the same layers of the different mapping patterns.

For example, out of the DMRS in layer #1 of mapping pattern #1 and the DMRS in layer #2 of mapping pattern #2 in FIG. 7, the DMRSs in the same REs (SC1, SC5, and SC9) are orthogonal to each other by the Cyclic Shift adopting the different phase rotation amounts.

With this configuration, the DMRSs in the same REs are orthogonal to each other in layer #1 of mapping pattern #1 allocated as user pattern #1 and in layer #2 of mapping pattern #2 allocated as user pattern #2. This makes it possible to suppress deterioration of channel estimation accuracy in each of the user terminals (user terminal #1 and user terminal #2).

Further, in this configuration, the same signal sequence and the same phase rotation amount are applied to the DMRSs mapped to the same REs in the same layers of the different mapping patterns. As a result, orthogonality of the DMRSs between the different layers in one mapping pattern is usable between the mapping patterns. This makes it possible to make the DMRSs mapped to the same REs in the different layers of the different mapping patterns orthogonal to each other.

Note that, in FIG. 5, the DMRSs are mapped to the same REs in layer #3 of mapping pattern #1 allocated as user pattern #1 and in layer #4 of mapping pattern #2 allocated as user pattern #2. As for the DMRSs mapped to the same REs in layer #3 and layer #4, applying the same signal sequence and the same phase rotation amount to the DMRSs mapped to the same REs in the same layers of the different mapping patterns makes the DMRSs mapped to the same REs in the different layers of the different mapping patterns orthogonal to each other, as with the relationship of layer #1 and layer #2 illustrated in FIG. 7.

Note that, in a case where the user patterns illustrated in FIG. 5 are configured, the DMRS collides with the other signal (for example, data channel of other user) in some cases. In this case, the user terminal can perform signal processing while regarding the other signal as noise.

Next, an example in which user patterns are configured based on mapping patterns different from the mapping patterns in FIG. 4 is described as a second application example.

Second Application Example

Figure 8:
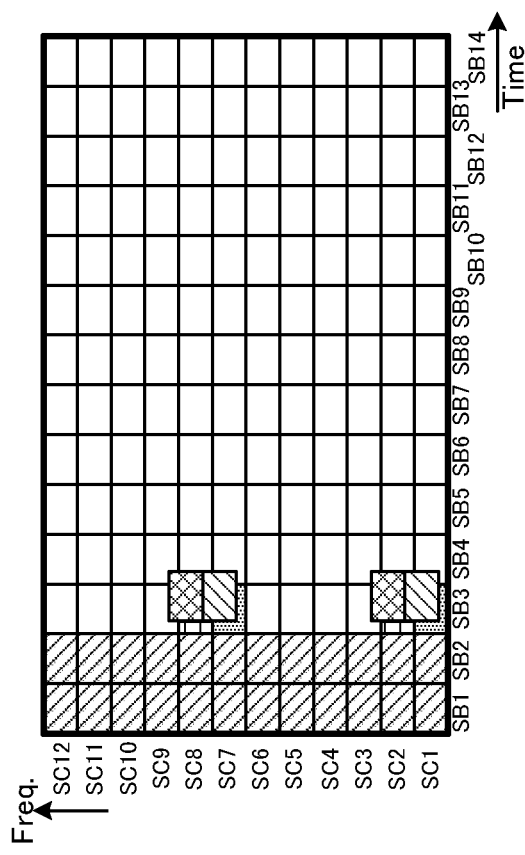
FIG. 8 illustrates mapping patterns according to a second application example.
Figure 8:
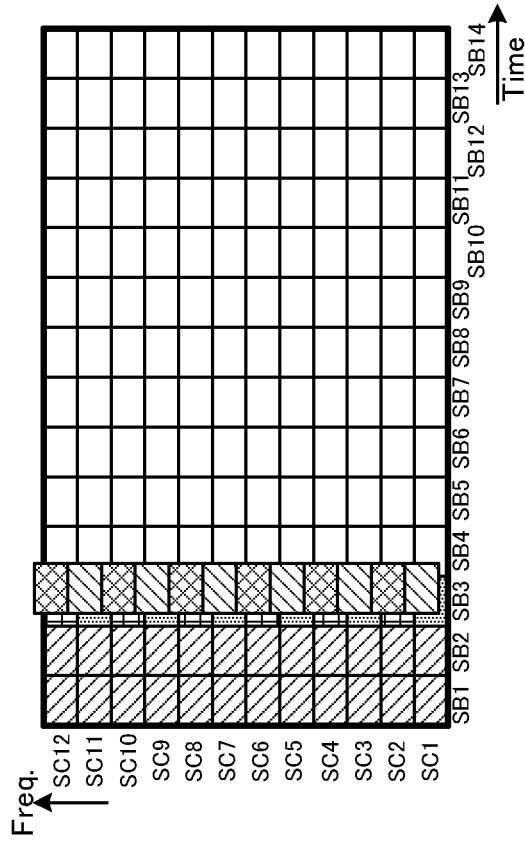

FIG. 8 illustrates mapping patterns according to the second application example. FIG. 8 illustrates mapping pattern #1 similar to mapping pattern #1 in FIG. 4 and mapping pattern #3 different from mapping pattern #2 in FIG. 4.

Mapping pattern #3 has a configuration in which a part of REs to which the DMRS is mapped in mapping pattern #1 is decimated. In the example of FIG. 8, mapping pattern #3 has a configuration in which the REs of SC3 to SC6 and SC9 to SC12 of SB3 in mapping pattern #1 are decimated.

For example, scheduler 101 of radio base station 10 selects one mapping pattern for each user terminal from the two mapping patterns illustrated in FIG. 8, based on the request condition and/or the propagation path environment of each user terminal. For example, in a case where user terminal #1 moves at a speed higher than a predetermined speed and user terminal #2 moves at a speed lower than the predetermined speed, scheduler 101 selects mapping pattern #1 for user terminal #1, and selects mapping pattern #3 for user terminal #2. Further, in a case where user terminal #1 has communication quality lower than predetermined communication quality and user terminal #2 has communication quality higher than the predetermined communication quality, scheduler 101 selects mapping pattern #1 for user terminal #1, and selects mapping pattern #3 for user terminal #2.

In addition, scheduler 101 allocates one or more layers to each user terminal to configure the user pattern of each user terminal.

In the following, an example in which layer #1 and layer #3 of mapping pattern #1 are allocated to user terminal #1, and layer #2 and layer #4 of mapping pattern #3 are allocated to user terminal #2 is described.

Figure 9:
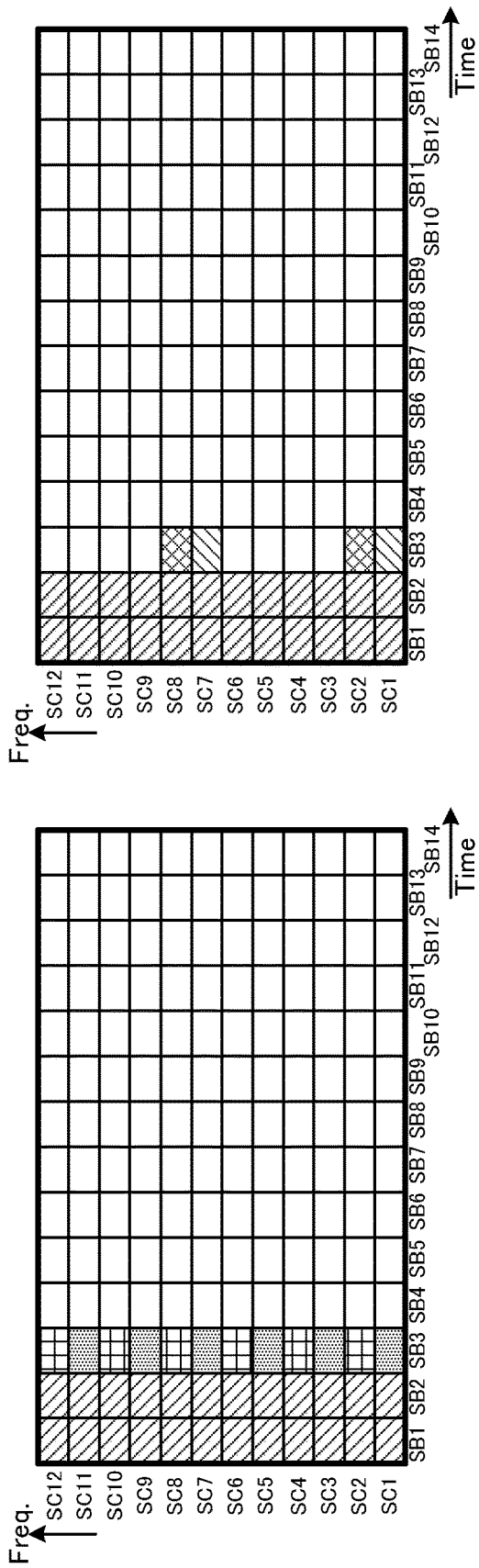
FIG. 9 illustrates user patterns according to the second application example.

FIG. 9 illustrates user patterns according to the second application example. User pattern #1 (user pattern of user terminal #1) includes layer #1 and layer #3 of mapping pattern #1, and user pattern #2 (user pattern of user terminal #2) includes layer #2 and layer #4 of mapping pattern #3.

In this example, the DMRSs are mapped to the same REs in layer #1 of user pattern #1 and layer #2 of user pattern #2. The DMRSs mapped to the same REs in the different user patterns are collapsed in orthogonality. Accordingly, the DMRSs mapped to the same REs in user pattern #1 and user pattern #2 are configured so as to be orthogonal to each other by Cyclic Shift.

Figure 10:
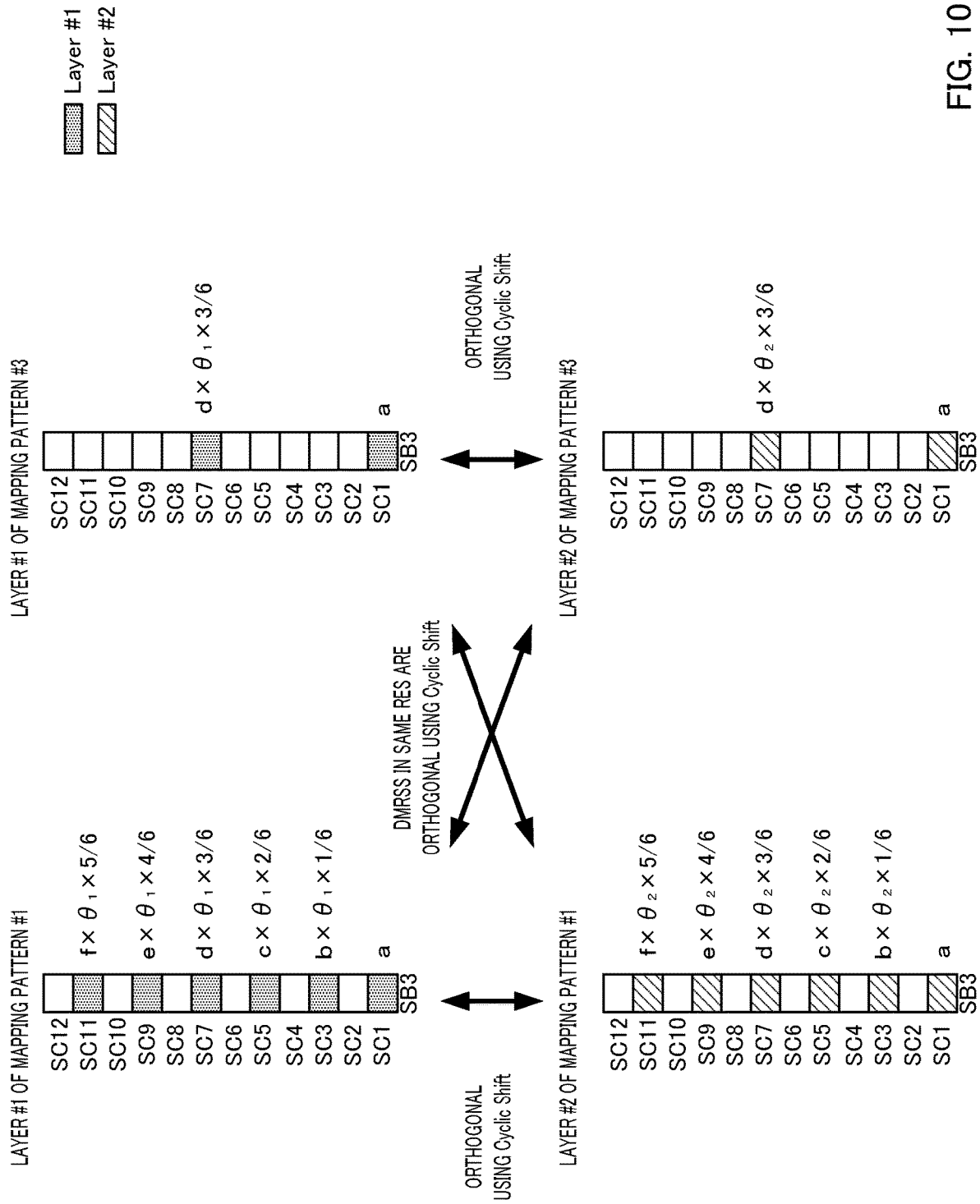
FIG. 10 illustrates exemplary Cyclic Shift according to the second application example.

FIG. 10 illustrates an example of the Cyclic Shift according to the second application example. FIG. 10 illustrates an example of the Cyclic Shift for the DMRSs in layer #1 and layer #2 of mapping pattern #1 and in layer #1 and layer #2 of mapping pattern #2 illustrated in FIG. 8. Note that only SB3 to which the DMRS is mapped is illustrated in FIG. 10, and illustration of other symbols is omitted.

In FIG. 10, "a" to "f" in each of the REs represent a signal sequence of the DMRS, and $\theta_1$ and $\theta_2$ represent phase rotation amounts different from each other. Note that the same value or different values may be applied to "a" to "f".

In the example of FIG. 10, as with FIG. 6, the DMRSs mapped to the same REs in the different layers of the same mapping pattern are orthogonal to each other by the Cyclic Shift.

Further, the same signal sequence and the same phase rotation amount are applied to the DMRSs mapped to the same REs in the same layers of the different mapping patterns. The DMRS having the same value is mapped to the same REs in the different mapping patterns by applying the same signal sequence and the same phase rotation amount.

For example, the same signal sequence "d" and the same phase rotation amount $\theta_1 \times \frac{3}{6}$ are applied to the DMRS mapped to SC7 in layer #1 of mapping pattern #1 and the DMRS mapped to SC7 in layer #1 of mapping pattern #3 in FIG. 10.

As described above, the DMRSs mapped to the same REs in the different layers of the different mapping patterns are orthogonal to each other by applying the same signal sequence and the same phase rotation amount to the DMRSs mapped to the same REs in the same layers of the different mapping patterns.

For example, out of the DMRS in layer #1 of mapping pattern #1 and the DMRS in layer #2 of mapping pattern #3 in FIG. 10, DMRSs in the same REs (SC1 and SC7) are orthogonal to each other by the Cyclic Shift adopting the different phase rotation amounts.

With this configuration, the DMRSs in the same REs are orthogonal to each other in layer #1 of mapping pattern #1 allocated as user pattern #1 and in layer #2 of mapping pattern #3 allocated as user pattern #2. This makes it possible to suppress deterioration of channel estimation accuracy in each of the user terminals (user terminal #1 and user terminal #2).

Further, in this configuration, the same signal sequence and the same phase rotation amount are applied to the DMRSs mapped to the same REs in the same layers of the different mapping patterns. As a result, orthogonality of the DMRSs between the different layers in one mapping pattern is usable between the mapping patterns. This makes it possible to make the DMRSs mapped to the same REs in the different layers of the different mapping patterns orthogonal to each other.

Note that, in FIG. 9, the DMRSs are mapped to the same REs in layer #3 of mapping pattern #1 allocated as user pattern #1 and in layer #4 of mapping pattern #3 allocated as user pattern #2. As for the DMRSs mapped to the same REs in layer #3 and layer #4, applying the same signal sequence and the same phase rotation amount to the DMRSs mapped to the same REs in the same layers of the different mapping patterns makes the DMRSs mapped to the same REs in the different layers of the different mapping patterns orthogonal to each other, as with the relationship of layer #1 and layer #2 illustrated in FIG. 10.

Further, in a case where the user patterns illustrated in FIG. 9 are configured, the DMRS collides with the other signal (for example, data channel of other user) in some cases. In this case, the user terminal can perform signal processing while regarding the other signal as noise.

Next, an example in which user patterns are configured based on mapping patterns different from the mapping patterns in FIG. 4 and FIG. 8 is described as a third application example.

Third Application Example

Figure 11:
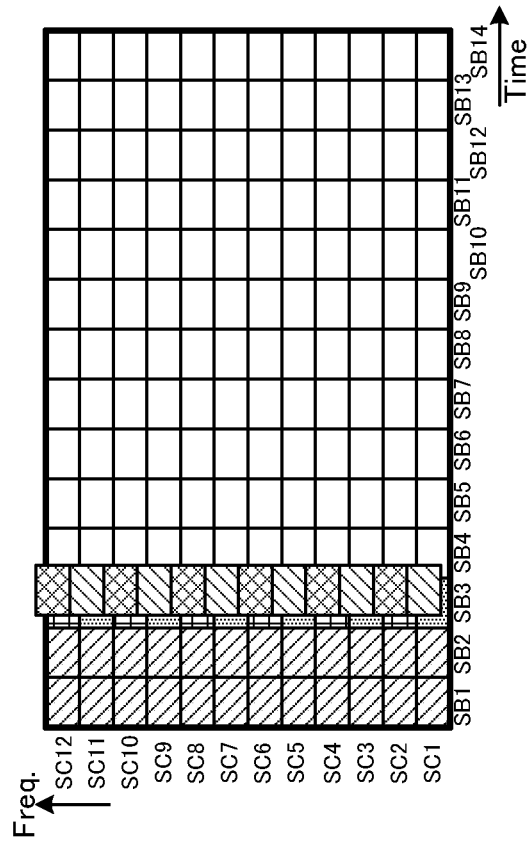
FIG. 11 illustrates mapping patterns according to a third application example.

FIG. 11 illustrates mapping patterns according to the third application example. FIG. 11 illustrates mapping pattern #1 similar to mapping pattern #1 in FIG. 4 and FIG. 8 and mapping pattern #4 different from mapping pattern #2 in FIG. 4 and mapping pattern #3 in FIG. 8.

Mapping pattern #4 has a configuration in which a part of REs to which the DMRS is mapped in mapping pattern #1 is decimated. In the example of FIG. 11, mapping pattern #4 has a configuration in which the REs of SC7 to SC12 of SB3 in mapping pattern #1 are decimated.

For example, scheduler 101 of radio base station 10 selects one mapping pattern for each user terminal from the two mapping patterns illustrated in FIG. 11, based on the request condition and/or the propagation path environment of each user terminal. For example, in a case where user terminal #1 moves at a speed higher than a predetermined speed and user terminal #2 moves at a speed lower than the predetermined speed, scheduler 101 selects mapping pattern #1 for user terminal #1, and selects mapping pattern #4 for user terminal #2. Further, in a case where user terminal #1 has communication quality lower than predetermined communication quality and user terminal #2 has communication quality higher than the predetermined communication quality, scheduler 101 selects mapping pattern #1 for user terminal #1, and selects mapping pattern #4 for user terminal #2.

In addition, scheduler 101 allocates one or more layers to each user terminal to configure the user pattern of each user terminal.

In the following, an example in which layer #1 and layer #3 of mapping pattern #1 are allocated to user terminal #1, and layer #2 and layer #4 of mapping pattern #4 are allocated to user terminal #2 is described.

Figure 12:
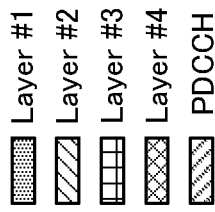
FIG. 12 illustrates user patterns according to the third application example.
Figure 12:
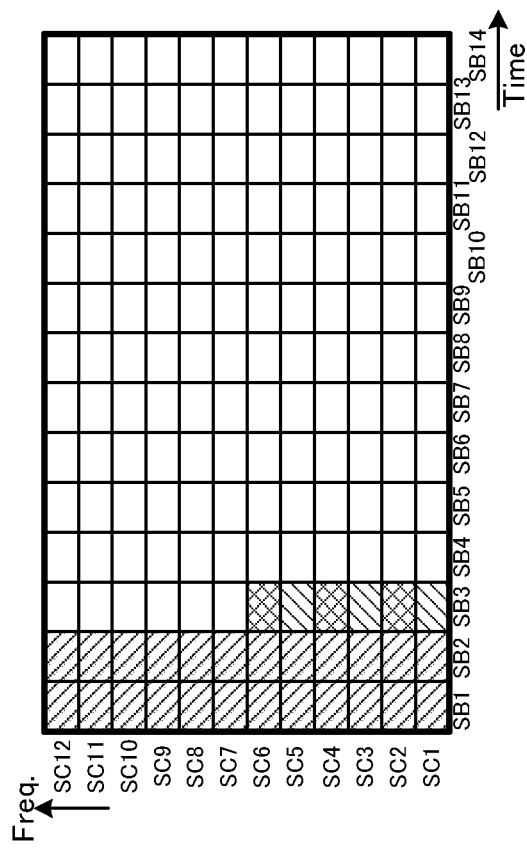
Figure 12:
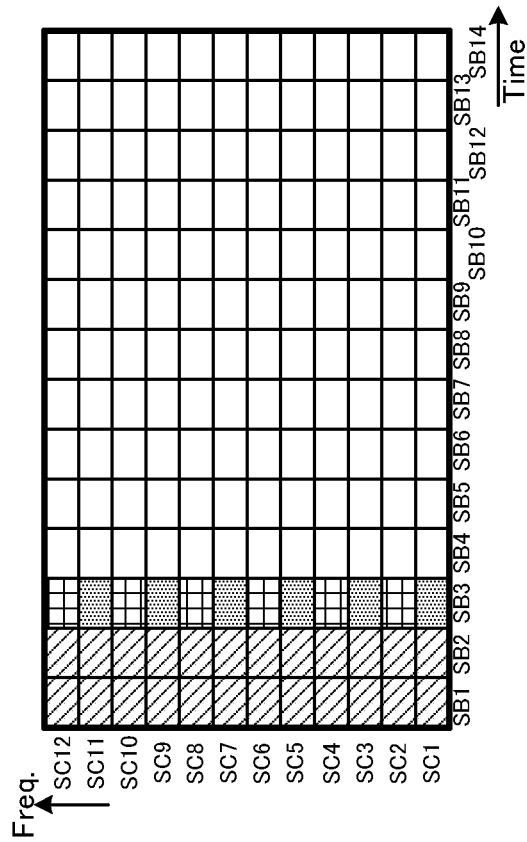

FIG. 12 illustrates user patterns according to the third application example. User pattern #1 (user pattern of user terminal #1) includes layer #1 and layer #3 of mapping pattern #1, and user pattern #2 (user pattern of user terminal #2) includes layer #2 and layer #4 of mapping pattern #4.

In this example, the DMRSs are mapped to the same REs in layer #1 of user pattern #1 and layer #2 of user pattern #2. The DMRSs mapped to the same REs in the different user patterns are collapsed in orthogonality. Accordingly, the DMRSs mapped to the same REs in user pattern #1 and user pattern #2 are configured so as to be orthogonal to each other by Cyclic Shift.

Figure 13:
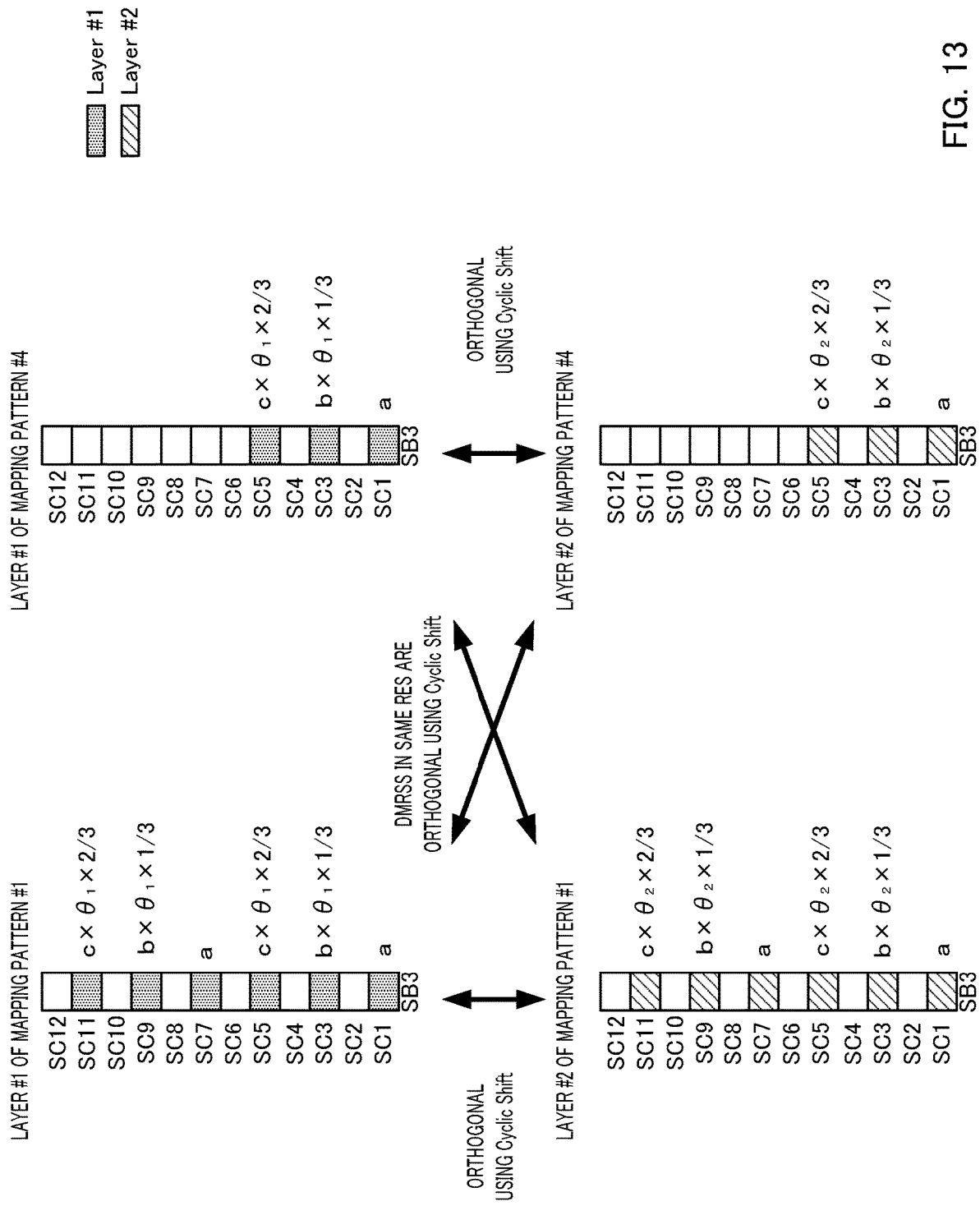
FIG. 13 illustrates exemplary Cyclic Shift according to the third application example.

FIG. 13 illustrates an example of the Cyclic Shift according to the third application example. FIG. 13 illustrates an example of the Cyclic Shift for the DMRSs in layer #1 and layer #2 of mapping pattern #1 and in layer #1 and layer #2 of mapping pattern #2 illustrated in FIG. 11. Note that only SB3 to which the DMRS is mapped is illustrated in FIG. 13, and illustration of other symbols is omitted.

In FIG. 13, "a" to "c" in each of the REs represent a signal sequence of the DMRS, and $\theta_1$ and $\theta_2$ represent phase rotation amounts different from each other. Note that the same value or different values may be applied to "a" to "c".

In the example of FIG. 13, as with FIG. 6, the DMRSs mapped to the same REs in the different layers of the same mapping pattern are orthogonal to each other by the Cyclic Shift.

Further, the same signal sequence and the same phase rotation amount are applied to the DMRSs mapped to the same REs in the same layers of the different mapping patterns. The DMRS having the same value is mapped to the same REs in the different mapping patterns by applying the same signal sequence and the same phase rotation amount.

For example, the same signal sequence "b" and the same phase rotation amount $\theta_1 \times \frac{1}{3}$ are applied to the DMRS mapped to SC3 in layer #1 of mapping pattern #1 and the DMRS mapped to SC3 in layer #1 of mapping pattern #4 in FIG. 13.

As described above, the DMRSs mapped to the same REs in the different layers of the different mapping patterns are orthogonal to each other by applying the same signal sequence and the same phase rotation amount to the DMRSs mapped to the same REs in the same layers of the different mapping patterns.

For example, out of the DMRS in layer #1 of mapping pattern #1 and the DMRS in layer #2 of mapping pattern #4 in FIG. 13, DMRSs in the same REs (SC1, SC3, and SC5) are orthogonal to each other by the Cyclic Shift adopting the different phase rotation amounts.

With this configuration, the DMRSs in the same REs are orthogonal to each other in layer #1 of mapping pattern #1 allocated as user pattern #1 and in layer #2 of mapping pattern #4 allocated as user pattern #2. This makes it possible to suppress deterioration of channel estimation accuracy in each of the user terminals (user terminal #1 and user terminal #2).

Further, in this configuration, the same signal sequence and the same phase rotation amount are applied to the DMRSs mapped to the same REs in the same layers of the different mapping patterns. As a result, orthogonality of the DMRSs between the different layers in one mapping pattern is usable between the mapping patterns. This makes it possible to make the DMRSs mapped to the same REs in the different layers of the different mapping patterns orthogonal to each other.

Note that, in FIG. 12, the DMRSs are mapped to the same REs in layer #3 of mapping pattern #1 allocated as user pattern #1 and in layer #4 of mapping pattern #4 allocated as user pattern #2. As for the DMRSs mapped to the same REs in layer #3 and layer #4, applying the same signal sequence and the same phase rotation amount to the DMRSs mapped to the same REs in the same layers of the different mapping patterns makes the DMRSs mapped to the same REs in the different layers of the different mapping patterns orthogonal to each other, as with the relationship of layer #1 and layer #2 illustrated in FIG. 13.

Further, in a case where the user patterns illustrated in FIG. 12 are configured, the DMRS collides with the other signal (for example, data channel of other user) in some cases. In this case, the user terminal can perform signal processing while regarding the other signal as noise.

Although, in the first application example, the second application example, and the third application example described above, the example in which the DMRSs in the different layers of the different mapping patterns are orthogonal to each other by the Cyclic Shift has been described, the present invention is not limited to the example. For example, the method for making the DMRSs orthogonal is changed by changing the layers allocated to each of the user terminals. For example, an example in which the DMRSs in the different layers of the different mapping patterns are orthogonal to each other by FDM is described as a fourth application example.

Fourth Application Example

Figure 14:
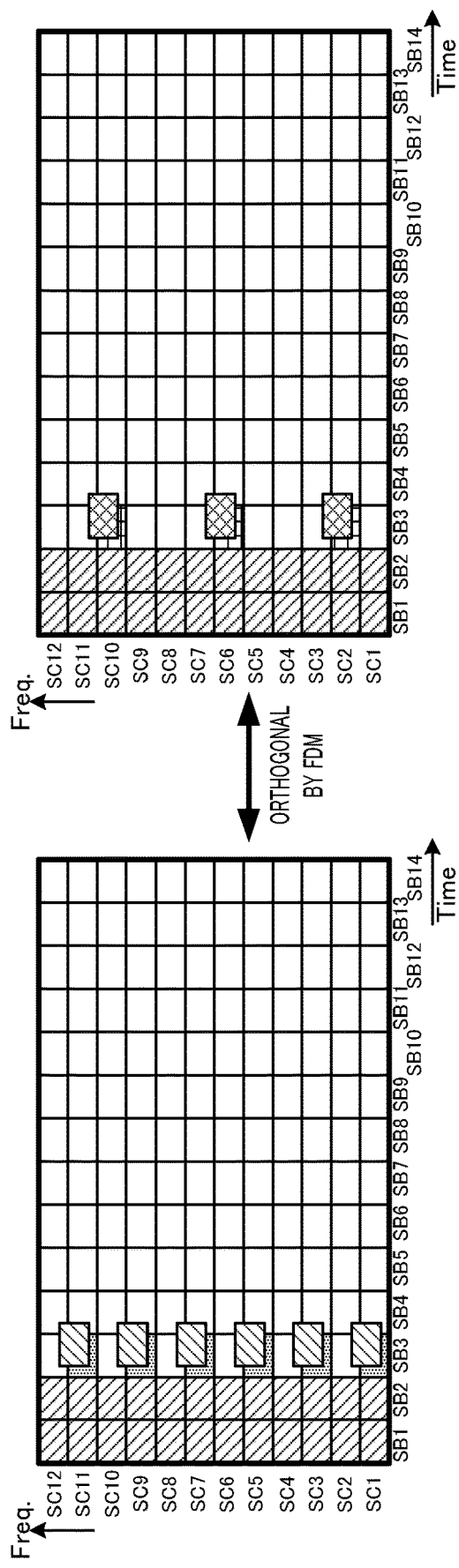
FIG. 14 illustrates user patterns according to a fourth application example.

FIG. 14 illustrates user patterns according to the fourth application example. FIG. 14 illustrates an example in which scheduler 101 allocates layer #1 and layer #2 of mapping pattern #1 (refer to FIG. 4) to user terminal #1, and allocates layer #3 and layer #4 of mapping pattern #2 (refer to FIG. 4) to user terminal #2.

In other words, user pattern #1 (user pattern of user terminal #1) in FIG. 14 includes layer #1 and layer #2 of mapping pattern #1 illustrated in FIG. 4, and user pattern #2 (user pattern of user terminal #2) includes layer #3 and layer #4 of mapping pattern #2 illustrated in FIG. 4.

In user pattern #1 and user pattern #2 in FIG. 14, the DMRSs are mapped to different subcarriers in the same symbol (SB3). In this case, the DMRSs in the different user patterns are orthogonal to each other by FDM.

With this configuration, the DMRSs in the different user patterns are not mapped to the same REs and are mapped to frequencies (subcarriers) different from each other. This makes it possible to suppress deterioration of channel estimation accuracy in each of the user terminals (user terminal #1 and user terminal #2).

In a case where the user patterns illustrated in FIG. 14 are configured, the DMRS collides with the other signal (for example, data channel of other user) in some cases. In this case, the user terminal can perform signal processing while regarding the other signal as noise.

Note that the example in which the DMRSs in the different layers of the different mapping patterns are orthogonal to each other by the Cyclic Shift has been described in the first application example, the second application example, and the third application example described above, and the example in which the DMRSs in the different layers of the different mapping patterns are orthogonal to each other by the FDM has been described in the fourth application example. Next, an example in which the DMRSs in the different layers of the different mapping patterns are orthogonal to each other by an Orthogonal Cover Code (OCC) sequence is described as a fifth application example.

Fifth Application Example

Figure 15:
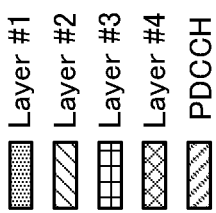
FIG. 15 illustrates mapping patterns according to a fifth application example.
Figure 15:
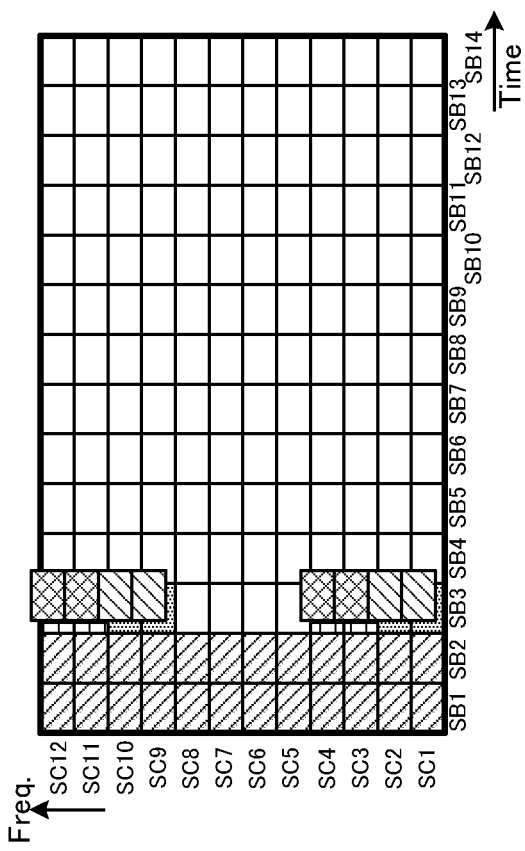
Figure 15:
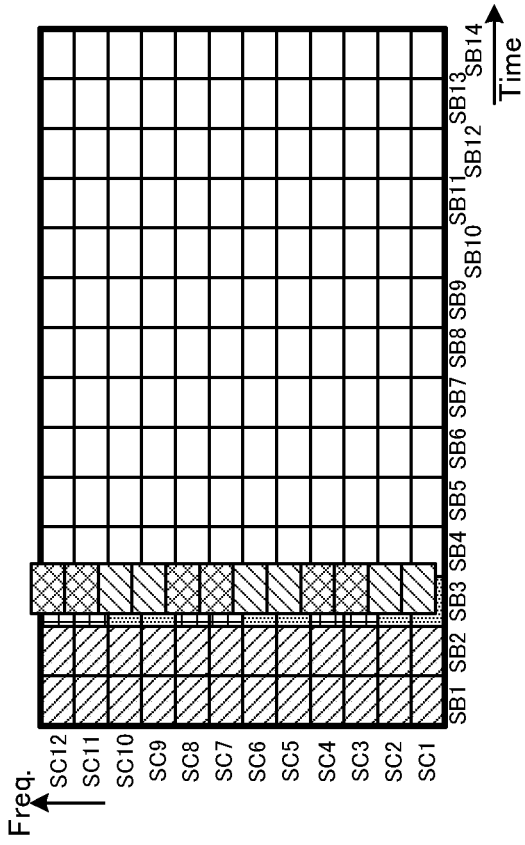

FIG. 15 illustrates mapping patterns according to the fifth application example. FIG. 15 illustrates mapping pattern #5 and mapping pattern #6.

Each of the mapping patterns indicates a mapping position of the DMRS in the RU as a resource allocation unit. Further, mapping pattern #5 and mapping pattern #6 each includes a mapping position of the DMRS in four layers (Layer #1 to Layer #4).

The control signal channel (for example, PDCCH) is mapped to the REs of two symbols (namely, SB1 and SB2) at the head of the RU.

Mapping pattern #5 is a pattern in which DMRS of each layer is relatively densely mapped to SB3, and mapping pattern #6 is a pattern in which the DMRS of each layer is relatively sparsely mapped to SB3, as compared with mapping pattern #5.

Further, mapping pattern #6 has a configuration in which a part of REs to which the DMRS is mapped in mapping pattern #5 is decimated. In the example of FIG. 15, mapping pattern #6 has a configuration in which the REs of SC5 to SC8 of SB3 in mapping pattern #5 are decimated.

For example, scheduler 101 of radio base station 10 selects one mapping pattern for each user terminal from the two mapping patterns illustrated in FIG. 15, based on the request condition and/or the propagation path environment of each user terminal. For example, in a case where user terminal #1 moves at a speed higher than a predetermined speed and user terminal #2 moves at a speed lower than the predetermined speed, scheduler 101 selects mapping pattern #5 for user terminal #1, and selects mapping pattern #6 for user terminal #2. Further, in a case where user terminal #1 has communication quality lower than predetermined communication quality and user terminal #2 has communication quality higher than the predetermined communication quality, scheduler 101 selects mapping pattern #5 for user terminal #1, and selects mapping pattern #6 for user terminal #2.

In addition, scheduler 101 allocates one or more layers to each user terminal to configure the user pattern of each user terminal.

In the following, an example in which layer #1 and layer #3 of mapping pattern #5 are allocated to user terminal #1, and layer #2 and layer #4 of mapping pattern #6 are allocated to user terminal #2 is described.

Figure 16:
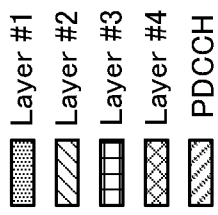
FIG. 16 illustrates user patterns according to the fifth application example.
Figure 16:
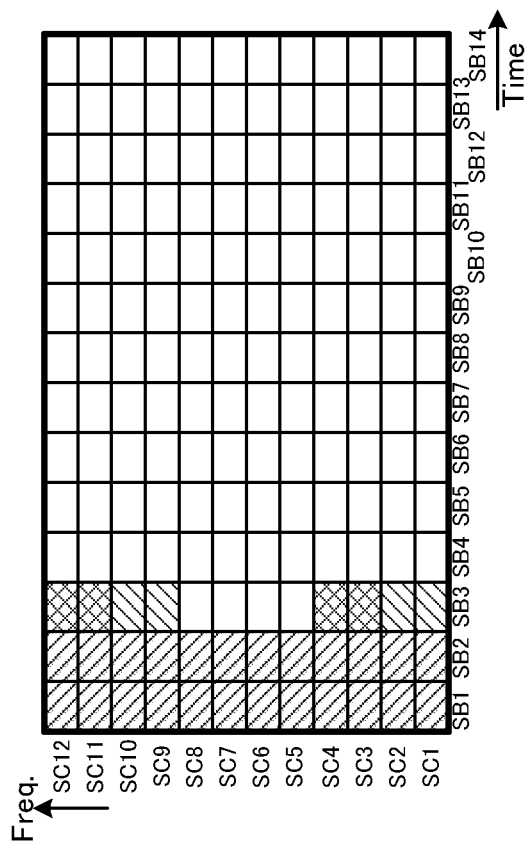
Figure 16:
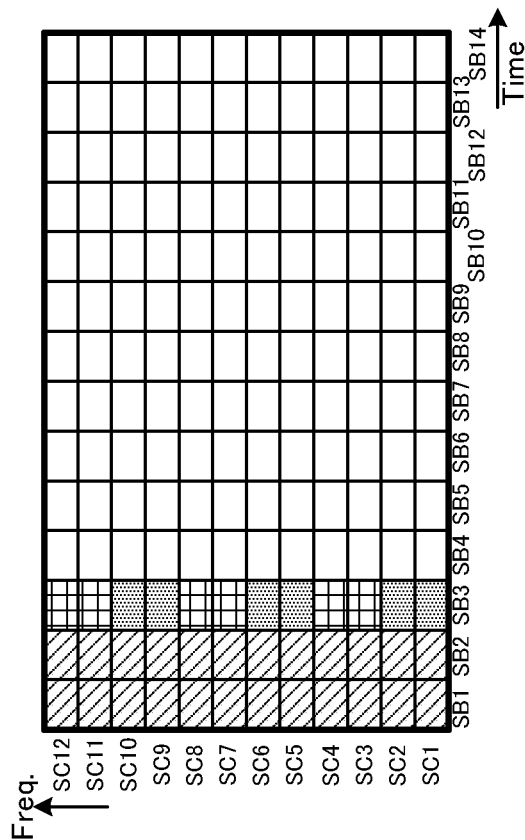

FIG. 16 illustrates user patterns according to the fifth application example. User pattern #1 (user pattern of user terminal #1) includes layer #1 and layer #3 of mapping pattern #5, and user pattern #2 (user pattern of user terminal #2) includes layer #2 and layer #4 of mapping pattern #6.

In this example, the DMRSs are mapped to the same REs in layer #1 of user pattern #1 and layer #2 of user pattern #2. The DMRSs mapped to the same REs in the different user patterns are collapsed in orthogonality. Accordingly, the DMRSs mapped to the same REs in user pattern #1 and user pattern #2 are configured so as to be orthogonal to each other by an OCC sequence.

Figure 17:
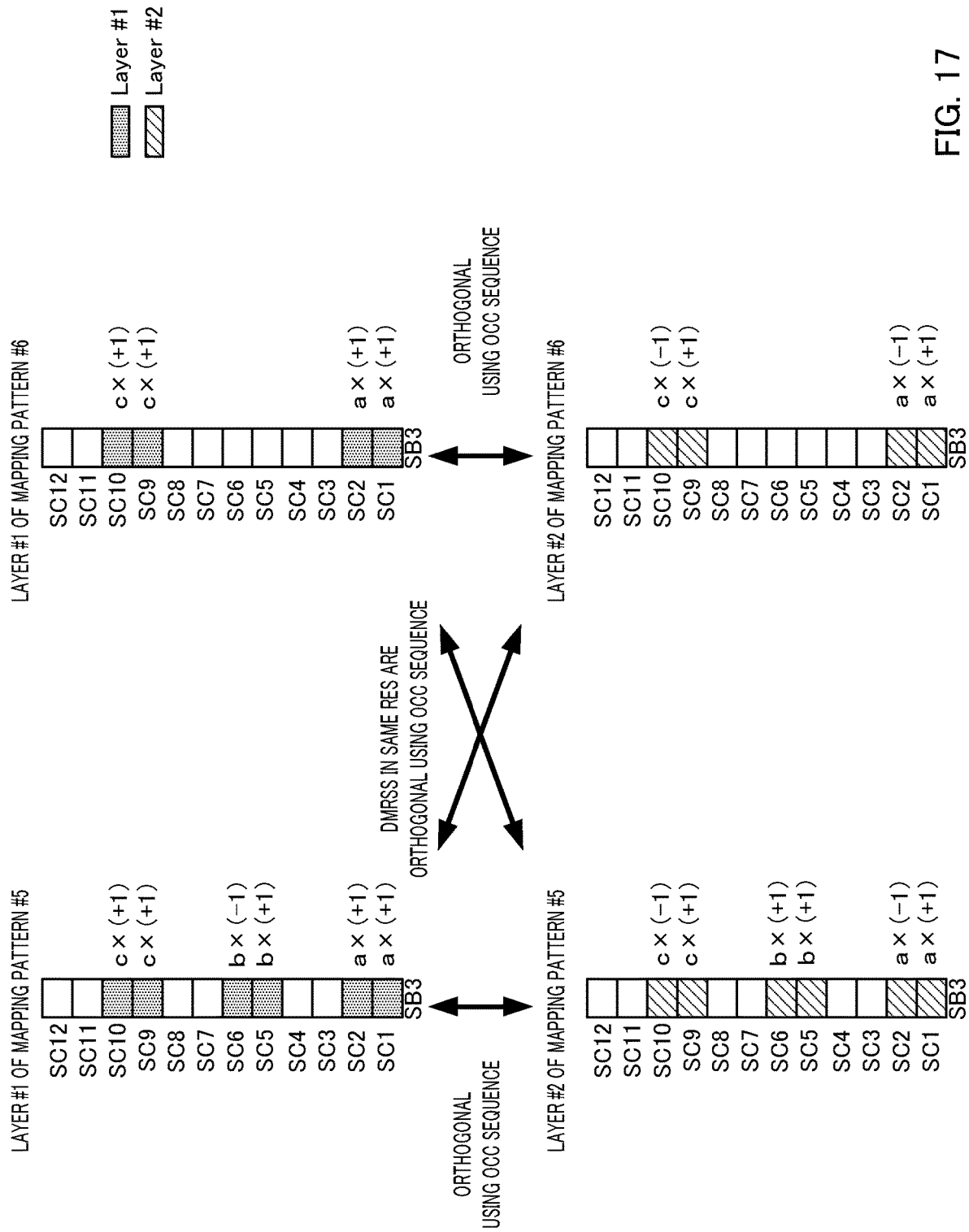
FIG. 17 illustrates an exemplary OCC sequence according to the fifth application example.

FIG. 17 illustrates an example of the OCC sequence according to the fifth application example. FIG. 17 illustrates an example of the OCC sequence for the DMRSs in layer #1 and layer #2 of mapping pattern #5 and in layer #1 and layer #2 of mapping pattern #6 illustrated in FIG. 15. Note that only SB3 to which the DMRS is mapped is illustrated in FIG. 17, and illustration of other symbols is omitted.

In FIG. 17, "a" to "c" in each of the REs represent a signal sequence of the DMRS, and (+1) and (−1) represent elements of the OCC sequence with a sequence length of 2. Note that the same value or different values may be applied to "a" to "c". Further, different values may be applied to "a" to "c" between different layers.

The DMRSs mapped to the same REs in the different layers of the same mapping pattern are orthogonal to each other by the OCC sequence.

For example, the DMRS in layer #1 of mapping pattern #5 and the DMRS in layer #2 of mapping pattern #5 in FIG. 17 are orthogonal to each other by the OCC sequence. More specifically, the OCC sequence including (+1) and (+1) is applied to the DMRS mapped to SC1 and SC2 in layer #1 of mapping pattern #5, and the OCC sequence including (+1) and (−1) is applied to the DMRS mapped to SC1 and SC2 in layer #2 of mapping pattern #5.

Likewise, the DMRS in layer #1 of mapping pattern #6 and the DMRS in layer #2 of mapping pattern #6 in FIG. 17 are orthogonal to each other by the OCC sequence.

Further, the same signal sequence and the same OCC sequence are applied to the DMRSs mapped to the same REs in the same layers of the different mapping patterns. The DMRS having the same value is mapped to the same REs in the different mapping patterns by applying the same signal sequence and the same orthogonal sequence.

For example, the signal sequence "a" is applied to each of the DMRS mapped to SC1 and SC2 in layer #1 of mapping pattern #5 and the DMRS mapped to SC1 and SC2 in layer #1 of mapping pattern #6 in FIG. 17, and the OCC sequence including (+1) and (+1) is applied to the signal sequence.

As described above, the DMRSs mapped to the same REs in the different layers of the different mapping patterns are orthogonal to each other by applying the same signal sequence and the same OCC sequence to the DMRSs mapped to the same REs in the same layers of the different mapping patterns.

For example, out of the DMRS in layer #1 of mapping pattern #5 and the DMRS in layer #2 of mapping pattern #6 in FIG. 17, the DMRSs in the same REs (SC1, SC2, SC9, and SC10) are orthogonal to each other by the OCC sequence.

With this configuration, the DMRSs in the same REs are orthogonal to each other in layer #1 of mapping pattern #5 allocated as user pattern #1 and in layer #2 of mapping pattern #6 allocated as user pattern #2. This makes it possible to suppress deterioration of channel estimation accuracy in each of the user terminals (user terminal #1 and user terminal #2).

Further, in this configuration, the same signal sequence and the same OCC sequence are applied to the DMRSs mapped to the same REs in the same layers of the different mapping patterns. As a result, orthogonality of the DMRSs between the different layers in one mapping pattern is usable between the mapping patterns. This makes it possible to make the DMRSs mapped to the same REs in the different layers of the different mapping patterns orthogonal to each other.

Note that, in FIG. 16, the DMRSs are mapped to the same REs in layer #3 of mapping pattern #5 allocated as user pattern #1 and in layer #4 of mapping pattern #6 allocated as user pattern #2. As for the DMRSs mapped to the same REs in layer #3 and layer #4, applying the same signal sequence and the same OCC sequence to the DMRSs mapped to the same REs in the same layers of the different mapping patterns makes the DMRSs mapped to the same REs in the different layers of the different mapping patterns orthogonal to each other, as with the relationship of layer #1 and layer #2 illustrated in FIG. 6.

Further, in the case where the user patterns illustrated in FIG. 16 are configured, the DMRS collides with the other signal (for example, data channel of other user) in some cases. In this case, the user terminal can perform signal processing while regarding the other signal as noise.

Although the example using the OCC sequence has been described in the above-described fifth application example, the present invention is not limited to the example. The DMRSs may be made orthogonal to each other by the other orthogonal sequence different from the OCC sequence.

Note that, in the above-described fifth application example, the example in which the DMRSs in the different layers of the different mapping patterns are made orthogonal to each other by the OCC sequence has been described. In the fifth application example, the DMRSs in the different layers in the same user pattern are orthogonal to each other by FDM, for example, as illustrated in FIG. 16.

For example, the method for making the DMRSs orthogonal may be changed by changing the layers allocated to each of the user terminals. In the following, an example in which the DMRSs in the different layers of the same user pattern are orthogonal to each other by the OCC sequence and the DMRSs in the different layers of the different mapping patterns are orthogonal to each other by the FDM is described as a sixth application example.

Sixth Application Example

Figure 18:
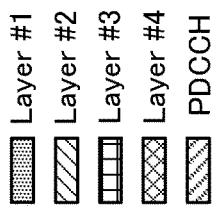
FIG. 18 illustrates user patterns according to a sixth application example.
Figure 18:
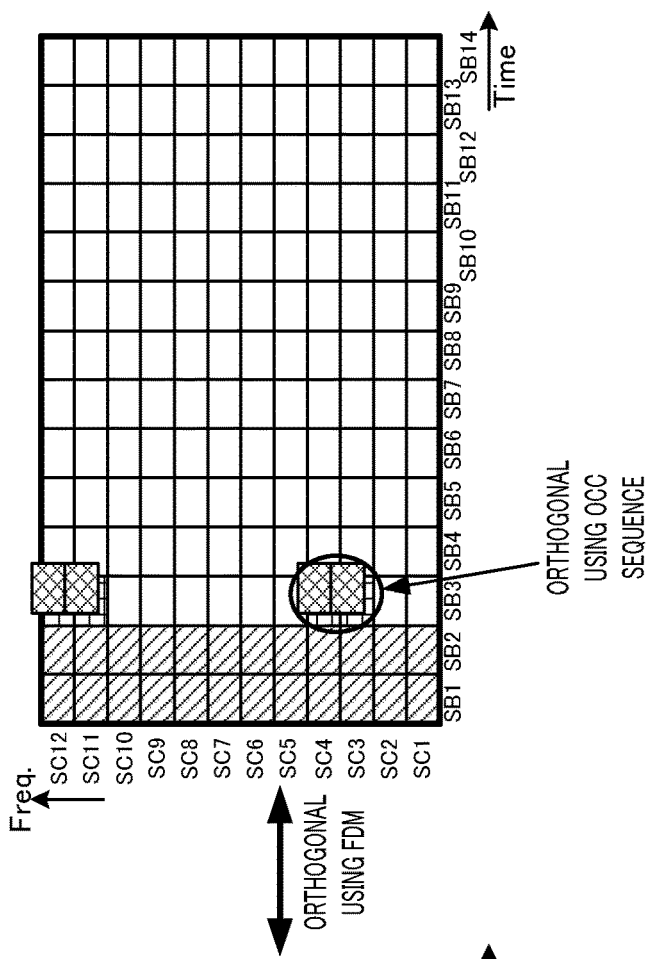
Figure 18:
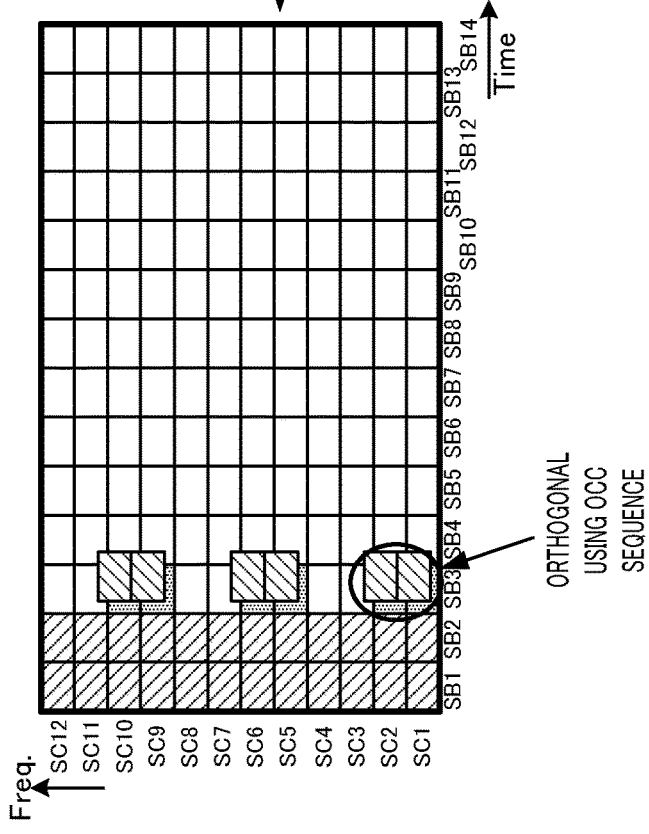

FIG. 18 illustrates user patterns according to the sixth application example. FIG. 18 illustrates an example in which scheduler 101 allocates layer #1 and layer #2 of mapping pattern #5 (refer to FIG. 15) to user terminal #1, and allocates layer #3 and layer #4 of mapping pattern #6 (refer to FIG. 15) to user terminal #2.

In other words, user pattern #1 (user pattern of user terminal #1) in FIG. 18 includes layer #1 and layer #2 of mapping pattern #5 illustrated in FIG. 15, and user pattern #2 (user pattern of user terminal #2) includes layer #3 and layer #4 of mapping pattern #6 illustrated in FIG. 15.

In user pattern #1 and user pattern #2 in FIG. 18, the DMRSs are mapped to different frequencies (subcarriers) in the same symbol (SB3). In this case, the DMRSs in the different user patterns are orthogonal to each other by the FDM.

In contrast, the DMRSs in the different layers of the same user pattern are orthogonal to each other by the OCC sequence. At this time, the same signal sequence and the same OCC sequence are applied to the DMRSs mapped to the same REs in the same layers of the different mapping patterns.

For example, in user pattern #1 including layer #1 and layer #2 of mapping pattern #5, the DMRSs in the different layers are orthogonal to each other by the OCC sequence by applying the OCC sequence as with layer #1 and layer #2 of mapping pattern #5 illustrated in FIG. 17.

With this configuration, the DMRSs in the different user patterns are not mapped to the same REs and are mapped at the different frequencies (subcarriers). This makes it possible to suppress deterioration of channel estimation accuracy in each of the user terminals (user terminal #1 and user terminal #2).

Note that, in the case where the user patterns illustrated in FIG. 18 are configured, the DMRS collides with the other signal (for example, data channel of other user) in some cases. In this case, the user terminal can perform signal processing while regarding the other signal as noise.

As described above, in the first configuration example, the example in which, out of the two mapping patterns different in density of the DMRS (for example, mapping interval and/or number of DMRS in frequency direction and/or time direction) from each other, the mapping pattern with low DMRS density has a configuration in which a part of REs to which the DMRS is mapped in mapping pattern with high DMRS density is decimated has been described.

Note that, in the first configuration example, as seen from the user pattern (user pattern #2 described above) configured based on the mapping pattern with low DMRS density, the DMRS mapped to the REs same as the user pattern (user pattern #1 described above) configured based on the mapping pattern with high DMRS density is orthogonal by the OCC sequence or the Cyclic Shift. On the other hand, as seen from user pattern #1, the DMRS mapped to the REs same as user pattern #2 is orthogonal by the OCC sequence or the Cyclic Shift. Further, as seen from user pattern #1, the DMRS mapped to the REs different from user pattern #2 collides with the other signal (for example, data channel of other user). In the case where the DMRS collides with the other signal (for example, data channel of other user), the user terminal can perform signal processing while regarding the other signal as noise.

Further, in the first configuration example, the example in which the different layers (different DMRS ports) of the different mapping patterns are allocated to each of the user terminals has been described. For example, in the case where the same layers (same DMRS ports) of the different mapping patterns are allocated to each of the user terminals, the method of the above-described first configuration example may not be applied.

Although, in the application examples of the first configuration example, the example in which scheduler 101 selects one mapping pattern for each user terminal from the mapping patterns previously prepared, and allocates one or more layers (one or more DMRS ports) of the plurality of layers (plurality of DMRS ports) of the selected mapping pattern to configure the user pattern (DMRS user terminal transmission pattern) has been described, the present invention is not limited to the example. For example, the plurality of user patterns may be previously prepared, and scheduler 101 may select different user patterns for the user terminals based on the request condition and/or the propagation path environment of the user terminals.

In this case, the DMRSs mapped to the REs defined for each of the plurality of user patterns are configured so as to be orthogonal to one another between the different user patterns.

Further, although the example in which the number of REs to which the DMRS is mapped is different in the mapping patterns and in the user patterns has been described in the first configuration example, the present invention is not limited to the example. The number of REs to which the DMRS is mapped may be the same in the mapping patterns and/or the user patterns.

Note that the present invention is not limited to the first configuration example, and can adopt various configurations. In the following, as a second configuration example, an example in which the DMRS of the mapping pattern with low density is mapped to the REs different from the REs of the DMRS of the mapping pattern with high density is described.

Second Configuration Example

Figure 19:
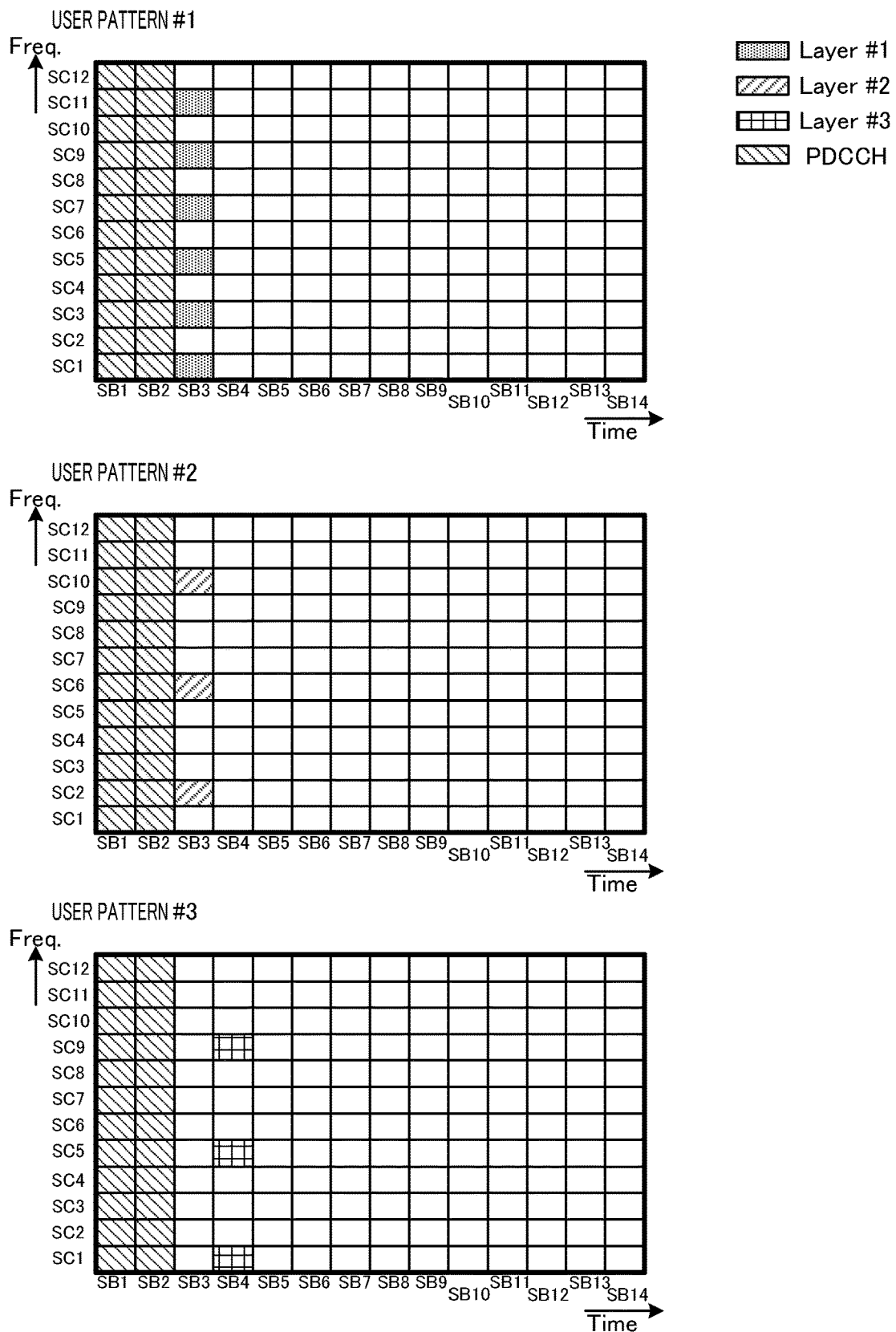
FIG. 19 illustrates user patterns according to a second configuration example.

FIG. 19 illustrates user patterns according to the second configuration example. FIG. 19 illustrates three user patterns (user pattern #1, user pattern #2, and user pattern #3) as examples. Each of the user patterns indicates a mapping position of the DMRS in the RU as a resource allocation unit.

The control signal channel (for example, PDCCH) is mapped to the REs of two symbols (namely, SB1 and SB2) at the head of the RU.

User pattern #1 (user pattern of user terminal #1) is a pattern in which DMRS of layer #1 is relatively densely mapped to SB3, and user pattern #2 (user pattern of user terminal #2) is a pattern in which the DMRS of layer #2 is relatively sparsely mapped to SB3, as compared with user pattern #. User pattern #3 (user pattern of user terminal #3) is a pattern in which the DMRS of layer #3 is relatively sparsely mapped to SB4, as compared with user pattern #1.

User pattern #2 has a configuration in which the DMRS is mapped to a symbol same as the symbol (SB3) to which the DMRS of user pattern #1 is mapped but the DMRS is mapped to frequencies (subcarriers) different from the subcarriers to which the DMRS of user pattern #1 is mapped.

Further, user pattern #3 has a configuration in which the DMRS is mapped to frequencies (subcarriers, for example, SC1, SC5, and SC9) same as the subcarriers to which the DMRS of user pattern #1 is mapped but the DMRS is mapped to a symbol (for example, SB4) different from the symbol to which the DMRS of user pattern #1 is mapped.

With this configuration, the DMRS of user pattern #1 and the DMRS of user pattern #2 are orthogonal to each other by FDM. Further, the DMRS of user pattern #1 and the DMRS of user pattern #3 are orthogonal to each other by TDM. Furthermore, the DMRS of user pattern #2 and the DMRS of user pattern #3 are orthogonal to each other by the FDM and the TDM. This makes it possible to suppress deterioration of channel estimation accuracy in each of the user terminals (user terminal #1 and user terminal #2).

Note that, in a case where the user patterns illustrated in FIG. 19 are configured, the DMRS collides with the other signal (for example, data channel of other user) in some cases. In this case, the user terminal can perform signal processing while regarding the other signal as noise.

Although the example in which the number of REs to which the DMRS is mapped is different depending on the user pattern has been described, the present invention is not limited to the example. The number of REs to which the DMRS is mapped may be the same among the user patterns. In this case, when all of the REs to which the DMRS is mapped are different among the user patterns, the DMRSs are orthogonal to one another among the user patterns by the FDM and/or the TDM.

As described above, in the second configuration example, the example in which the DMRS of the mapping pattern with low density is mapped to the REs different from the REs of the DMRS of the mapping pattern with high density has been described. Next, as a third configuration example, an example in which the DMRS of the mapping pattern with low density includes the DMRS mapped to the REs different from the REs of the DMRS of the mapping pattern with high density and the DMRS mapped to the REs same as the REs of a part of the DMRS of the mapping pattern with high density is described.

Third Configuration Example

Figure 20:
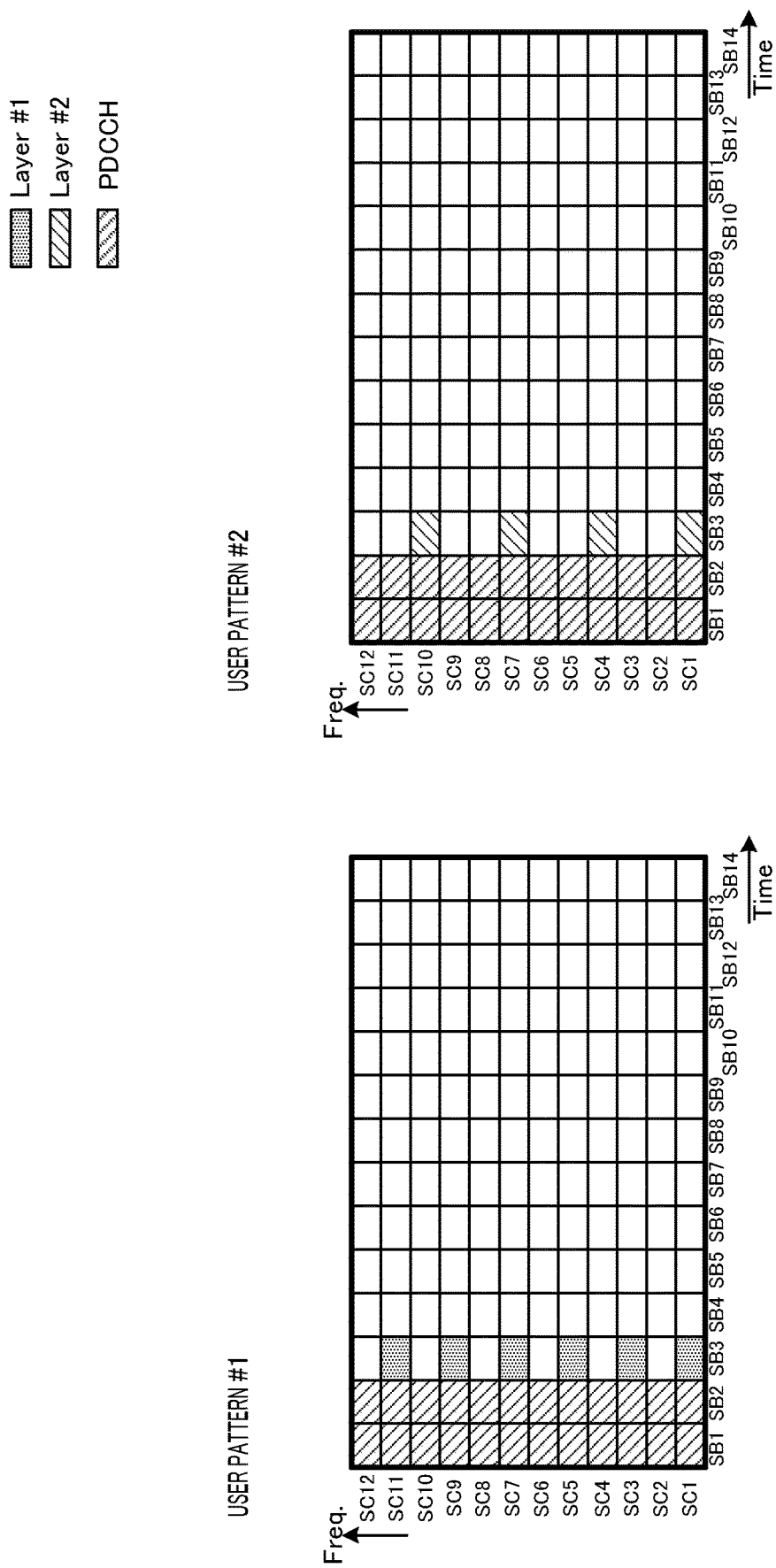
FIG. 20 illustrates user patterns according to a third configuration example.

FIG. 20 illustrates user patterns according to the third configuration example. FIG. 20 illustrates two user patterns (user pattern #1 and user pattern #2) as examples. Each of the user patterns indicates a mapping position of the DMRS in the RU as a resource allocation unit.

The control signal channel (for example, PDCCH) is mapped to the REs of two symbols (namely, SB1 and SB2) at the head of the RU.

User pattern #1 (user pattern of user terminal #1) is a pattern in which DMRS of layer #1 is relatively densely mapped to SB3, and user pattern #2 (user pattern of user terminal #2) is a pattern in which the DMRS of layer #2 is relatively sparsely mapped to SB3, as compared with user pattern #.

The DMRS of user pattern #2 has a configuration including the DMRS mapped to frequencies (subcarriers, SC1 and SC7) same as the subcarriers to which the DMRS of user pattern #1 is mapped and the DMRS mapped to subcarriers (SC4 and SC10) different from the subcarriers to which the DMRS of user pattern #1 is mapped.

In this configuration, the DMRSs mapped to SC1 and SC7 of SB3 included in user pattern #2 and user pattern #1 are the DMRSs mapped to the same REs. Therefore, the DMRSs are orthogonal to each other by the method illustrated in the first configuration example, for example, the method using the Cyclic Shift or the method using the OCC sequence.

Further, since the DMRS mapped to SC3, SC5, SC9, and SC11 of SB3 in user pattern #1 and DMRS mapped to SC4 and SC10 of SB3 in user pattern #2 are DMRSs mapped to REs different from one another, the DMRSs are orthogonal to each other by the method illustrated in the second configuration example, for example, the FDM and/or the TDM. Note that the DMRSs are orthogonal to each other by the FDM in the example of FIG. 20.

With this configuration, the DMRS of user pattern #1 and the DMRS of user pattern #2 can be orthogonal to each other. This makes it possible to suppress deterioration of channel estimation accuracy in each of the user terminals (user terminal #1 and user terminal #2).

Although the example in which the number of REs to which the DMRS is mapped is different depending on the user pattern has been described in the third configuration example, the present invention is not limited to the example. The number of REs to which the DMRS is mapped may be the same between the user patterns. In this case, a part of the REs to which the DMRS is mapped is different between the user patterns, and a remaining part is the same between the user patterns. In this case, the DMRSs that are mapped to REs partially different from each other are orthogonal to each other between the user patterns by the FDM and/or the TDM, and the DMRSs that are mapped to the same REs are orthogonal to each other by the method illustrated in the first configuration example (method using Cyclic Shift or method using orthogonal sequence).

<Effects of Present Embodiment>

In the present embodiment, the user pattern (DMRS mapping pattern of user terminal) is configured based on one mapping pattern selected from the plurality of mapping patterns previously prepared. At this time, the DMRSs of the plurality of mapping patterns are configured so as to be orthogonal to each other by at least one of the FDM, the CDM, and/or the CDM. This makes it possible to achieve the configuration (for example, mapping) of the DL reference signal (for example, DMRS) and the like that suppresses deterioration of channel estimation accuracy and is suitable for the future radio communication system.

Although the example in which one RU includes 14 symbols and 12 subcarriers has been described in the present embodiment, the present invention is not limited to the example. The size of the RU may be varied.

Further, although the example in which the control signal channel (for example, PDCCH) is mapped to the REs of two symbols (namely, SB1 and SB2) at the head of the RU has been described in the present embodiment, the mapping of the control signal channel is not limited to the example. Alternatively, the control signal channel may not be mapped to the RU.

Moreover, the number of layers (number of DMRS ports) in the present embodiment is illustrative, and the present invention is not limited thereto. For example, the number of layers of the DMRS may be five or more, or three or less.

Further, although the example in which the number of mapping patterns is two and the number of user terminals (number of user patterns) is two has been mainly described in each of the examples of the present embodiment, the present invention is not limited to the example. For example, the number of mapping patterns and/or the number of user terminals may be three or more.

Further, although the example in which the DMRS is mapped to third symbol (SB3) of the RU has been mainly described in the present embodiment, the present invention is not limited to the example. The DMRS may be mapped to after fourth symbol, or before second symbol.

For example, in addition to the DMRS (for example, Front-loaded DMRS) mapped near the head of the RU (in embodiment, third symbol), Additional DMRS may be mapped. Additional DMRS is DMRS mapped to enhance followability to channel time variation, for example, in a case where user terminal 20 moves at high speed.

The DMRS to which the present invention is applied is not particularly limited. For example, the present invention may be applied to only the above-described Front-loaded DMRS, to only Additional DMRS, or to both.

Further, the RU to which the present invention is applied is not particularly limited. In a case where a wide range of carrier frequencies is supported, the present invention may be applied to the RU in all of the carrier frequencies, or the present invention may be applied to the RU in a part of the carrier frequencies.

The embodiments of the present invention have been described above.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 21:
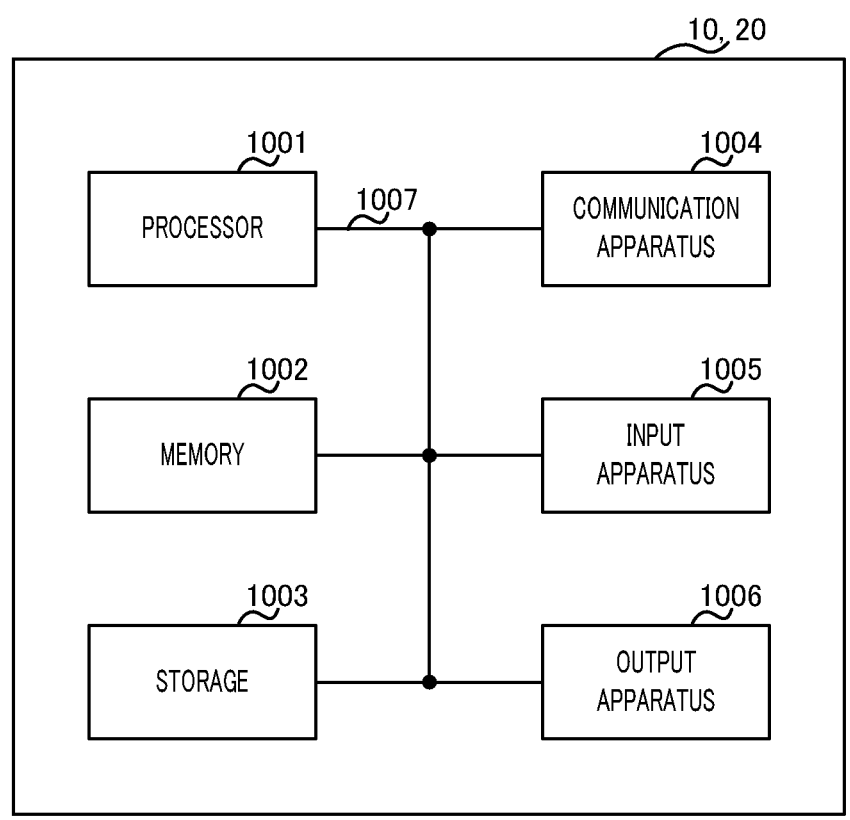
FIG. 21 illustrates an exemplary hardware configuration of a radio base station and a user terminal according to an embodiment of the present invention.

For example, the radio base station, the user terminal, and the like according to an embodiment of the present invention may function as a computer that executes processing of a radio communication method of the present invention. FIG. 21 illustrates an example of a hardware configuration of the radio base station and the user terminal according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the team "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, scheduler 101, control sections 108 and 203, transmission signal generation sections 102 and 206, coding and modulation sections 103 and 207, mapping sections 104 and 208, channel estimation sections 109 and 204, demodulation and decoding sections 110 and 205, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission sections 105 and 209, antennas 106 and 201, reception sections 107 and 202, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (for example, looking up in a table, a database or another data structure), ascertaining and the like. Also, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the tetras mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. Further, the DMRS may be called by other corresponding names such as a demodulation RS and a DM-RS.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini-slot, and the symbol indicate time units in transmitting signals. The radio frame, the subframe, the slot, the mini-slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, one slot or one mini-slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini-slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of mini-slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a mobile communication system.

REFERENCE SIGNS LIST

10 Radio Base Station
20 User Terminal
101 Scheduler
102, 206 Transmission Signal Generation Section
103, 207 Coding and Modulation Section
104, 208 Mapping Section
105, 209 Transmission Section
106, 201 Antenna
107, 202 Reception Section
108, 203 Control Section
109, 204 Channel Estimation Section
110, 205 Demodulation and Decoding Section

The invention claimed is:

1. A terminal, comprising:
a receiver that receives a downlink signal including a demodulation reference signal;
a processor that:
separates the demodulation reference signal from the downlink signal, and calculates a channel estimation value with use of
the demodulation reference signal,
wherein:
the demodulation reference signal is mapped to resource elements defined for a terminal transmission pattern,
the terminal transmission pattern is selected to be different between terminals, from a plurality of terminal transmission patterns,
the demodulation reference signals mapped to the resource elements defined for the respective terminal transmission patterns are orthogonal to each other between the terminal transmission patterns,
the plurality of terminal transmission patterns are different from each other in arrangement of at least a part of the resource elements to which the demodulation reference signal is mapped, and
the demodulation reference signals mapped to a same resource element between the terminal transmission patterns are orthogonal to each other by using c relic shift or an orthogonal sequence.

2. The terminal according to claim 1, wherein the plurality of terminal transmission patterns are different from each other in number of the resource elements to which the demodulation reference signal is mapped.

3. A base station, comprising:
a receiver coupled to a processor that:
selects different terminal transmission patterns for respective terminals from a plurality of terminal transmission patterns, and maps demodulation reference signals orthogonal to each other between the terminal transmission patterns to resource elements defined for the respective terminal transmission patterns; and a transmitter that transmits a downlink signal including the demodulation reference signal, wherein:

the plurality of terminal transmission patterns are different from each other in arrangement of at least a part of the resource elements to which the demodulation reference signal is mapped, and the demodulation reference signals mapped to a same resource element between the terminal transmission patterns are orthogonal to each other by using c relic shift or an orthogonal sequence.

4. A communication method, comprising:

receiving a downlink signal including a demodulation reference signal;

separating the demodulation reference signal from the downlink signal; and calculating a channel estimation value with use of the demodulation reference signal, wherein:

the demodulation reference signal is mapped to resource elements defined for a terminal transmission pattern, the terminal transmission pattern is selected to be different between terminals, from a plurality of terminal transmission patterns, the demodulation reference signals mapped to the resource elements defined for the respective terminal transmission patterns are orthogonal to each other between the terminal transmission patterns, the plurality of terminal transmission patterns are different from each other in arrangement of at least a part of the resource elements to which the demodulation reference signal is mapped, and the demodulation reference signals mapped to a same resource element between the terminal transmission patterns are orthogonal to each other by using cyclic shift or an orthogonal sequence.

\* \* \* \* \*